(12) United States Patent
Yamaguchi

(10) Patent No.: US 9,550,321 B2
(45) Date of Patent: *Jan. 24, 2017

(54) MOLDED PRODUCT DELIVERY APPARATUS AND BLOW MOLDING MACHINE

(71) Applicant: NISSEI ASB MACHINE CO., LTD., Nagano (JP)

(72) Inventor: Masaki Yamaguchi, Komoro (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/841,905

(22) Filed: Sep. 1, 2015

(65) Prior Publication Data

US 2016/0031146 A1    Feb. 4, 2016

Related U.S. Application Data

(63) Continuation of application No. 14/353,004, filed as application No. PCT/JP2012/077148 on Oct. 19, 2012, now Pat. No. 9,149,971.

(30) Foreign Application Priority Data

Oct. 21, 2011    (JP) .................................. 2011-231677
Oct. 17, 2012    (JP) .................................. 2012-229946

(51) Int. Cl.
*B29C 49/42*    (2006.01)
*B29C 49/06*    (2006.01)
(Continued)

(52) U.S. Cl.
CPC ......... *B29C 49/4205* (2013.01); *B29C 49/061* (2013.01); *B29C 49/4215* (2013.01);
(Continued)

(58) Field of Classification Search
CPC . B29C 49/4215; B29C 49/4205; B29C 49/421
(Continued)

(56) References Cited

U.S. PATENT DOCUMENTS 4,836,971 A    6/1989 Denis et al.
5,116,217 A    5/1992 Doudement et al.
(Continued)

FOREIGN PATENT DOCUMENTS

CN             2113141       8/1992
DE     102006012020 A1      9/2007
(Continued)

OTHER PUBLICATIONS

Supplementary Partial European Search Report, for Application No. EP12841140, 7 pages, Oct. 1, 2015.
(Continued)

*Primary Examiner* — Robert B Davis
(74) *Attorney, Agent, or Firm* — David L. Hoffman; Hoffman Patent Group

(57) ABSTRACT

In various embodiments, a molded product delivery apparatus or a blow molding machine includes a first transfer member that includes first paired chucks that hold a portion of an outer wall of a neck portion of a molded product, and a second transfer member that includes second paired chucks that hold another portion of the outer wall of the neck portion of the molded product. From a state where the molded product is held by both of the first paired chucks and the second paired chucks simultaneously, by opening one of the first paired chucks and the second paired chucks without interfering with the other, the molded product is delivered between the first paired chucks and the second paired chucks.

5 Claims, 19 Drawing Sheets

(51) Int. Cl.
- *B29C 49/28* (2006.01)
- *B29L 31/00* (2006.01)
- *B29C 49/64* (2006.01)
- *B29C 49/02* (2006.01)
- *B29K 105/00* (2006.01)

(52) U.S. Cl.
CPC ............ *B29C 49/28* (2013.01); *B29C 49/421* (2013.01); *B29C 49/6427* (2013.01); *B29C 2049/023* (2013.01); *B29K 2105/258* (2013.01); *B29L 2031/712* (2013.01); *B29L 2031/7158* (2013.01)

(58) Field of Classification Search
USPC ........................................................ 425/534
See application file for complete search history.

(56) References Cited

U.S. PATENT DOCUMENTS

| | | |
|---|---|---|
| 5,753,279 A | 5/1998 | Takada et al. |
| 2006/0099294 A1 | 5/2006 | Netsu |

FOREIGN PATENT DOCUMENTS

| | | |
|---|---|---|
| EP | 1762367 A2 | 3/2007 |
| FR | 2953441 A1 | 6/2011 |
| JP | AS6287815 U | 6/1987 |
| JP | AS62270316 | 11/1987 |
| JP | AH03021425 | 1/1991 |
| JP | AH08-132517 | 5/1996 |
| JP | A2004155147 | 3/2004 |
| JP | A2007099381 | 4/2007 |
| JP | A2007197021 | 8/2007 |
| WO | WO2006064103 A1 | 6/2006 |
| WO | WO2007043279 A1 | 4/2007 |
| WO | WO2012057016 A1 | 5/2012 |
| WO | WO2012123566 A1 | 9/2012 |

OTHER PUBLICATIONS

International Search Report, International Application No. PCT/JP2012/077148 mail date Jan. 22, 2013.
Partial machine translation of EP1762367A2 dated Mar. 2007 obtained from the espacenet website.
Partial machine translation of JP2007197021A dated Aug. 2007 obtained from the espacenet website.
Chinese Patent Office Action dated May 25, 2016 for Application No. 201280051636.8.

FIG.15
(A)
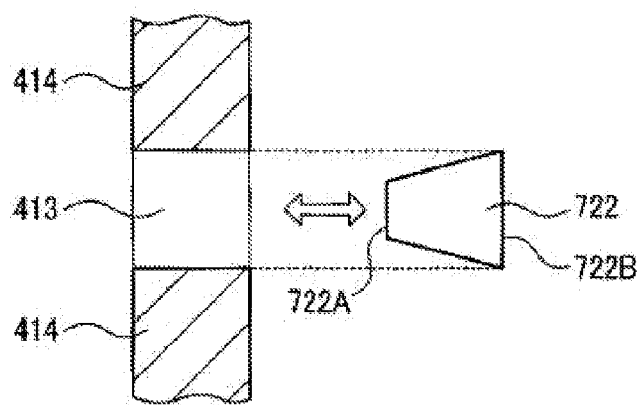
(B)
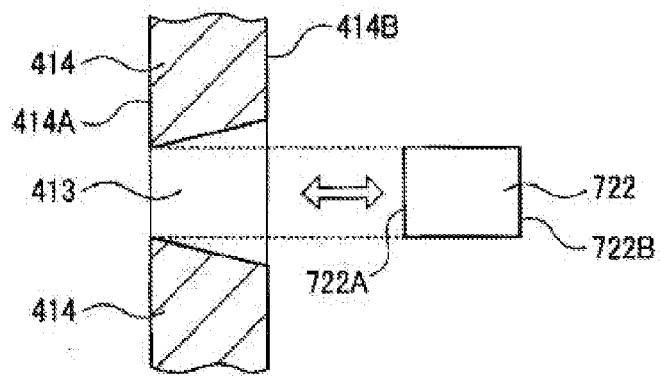
(C)
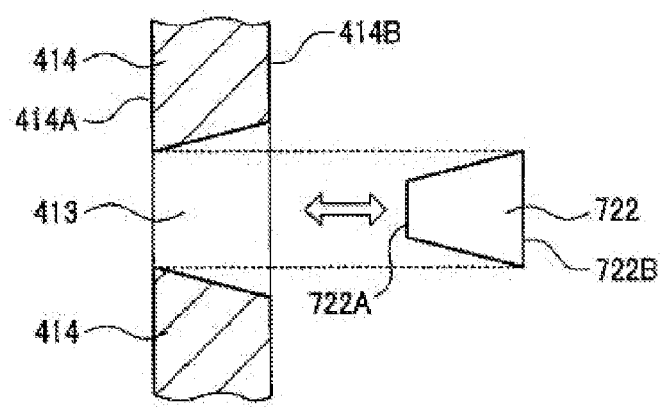

MOLDED PRODUCT DELIVERY APPARATUS AND BLOW MOLDING MACHINE

CROSS REFERENCE TO RELATED APPLICATIONS

This application is a continuation application of U.S. application Ser. No. 14353004, filed Apr. 18, 2014, which is a U.S. national stage application of International Patent Application No. PCT/JP2012/077148, having an international filing date of Oct. 19, 2012, which designated the United States and which claims priority from both Japanese Patent Application No. 2011-231677, filed on Oct. 21, 2011, and from Japanese Patent Application No. 2012-229946, filed on Oct. 17, 2012, the entirety of all of the above are incorporated herein by reference.

TECHNICAL FIELD

The present invention relates to a molded product delivery apparatus and a blow molding machine.

BACKGROUND ART

When delivering a molded product, for example, a preformed product (preform), an intermediate molded product (for example, a partially blow molded product) for use in blow molding, or a final molded product, such product must be transferred by holding its neck portion, which is not to be blow molded. The reason for this is that, when its shoulder portion, barrel portion and bottom portion to be blow molded are held at relatively high temperatures before and after blow molding, they will be deformed.

Thus, a molded product transfer apparatus used in a blow molding machine shown in the patent document 1 to 3 transfers a preform by holding the uneven portion (such as a support ring or a bead ring) of the neck portion of the preform.

CITATION LIST

Patent Document

Patent Document 1: JP-A-S62-270316
Patent Document 2: International Publication No. 2006/64103
Patent Document 3: JP-A-H03-021425

DISCLOSURE OF THE INVENTION

Problems that the Invention is to Solve

Conventionally, there is known a method in which, to a transfer apparatus for transferring a preform in an erected state with its neck portion facing upward by supporting the lower surface of a support ring serving as a projecting portion of the neck portion, the preform is delivered by gripping a portion of the neck portion above the support ring of the neck portion by a transfer chuck. Or, there is known a method in which, to a transfer apparatus for transferring a preform in an inverted state with its neck portion facing downward, the preform is delivered by gripping the neck portion by a transfer chuck.

According to these methods, in the transfer apparatus for transferring the preform in an erected state or in an inverted state, the preform is transferred without contacting with an outer wall of the neck portion existing nearer to an opening end side than the support ring. Therefore, the transfer chuck for delivering the preform to the transfer apparatus can secure a wide margin for gripping the outer peripheral wall of the neck portion.

Here, in the transfer apparatus for transferring the preform in an erected state, since the preform is transferred by supporting the lower surface of the support ring, the apparatus cannot be used for the inverted transfer and also it is not suitable for a high-speed transfer of the preform. That is, when the preform is transferred at high speeds, the lower surface of the support ring is damaged to impair the appearance of a molded product.

In the transfer apparatus for transferring the preform in an inverted state, since the preform is transferred by being held by a pin inserted into the neck portion, even when the preform is transferred at high speeds, the molded product is not damaged. However, in the erected state transfer, the preform falls off from the pin.

According to several aspects of the invention, there can be provided a molded product delivery apparatus which can deliver a molded product without using a flange support structure limited to erected transfer or an inverted support pin limited to inverted transfer, and a blow molding machine using such apparatus.

It is an object of the invention to provide a molded product delivery apparatus which can reduce an opening/closing time and includes paired chucks having a simple structure, and a blow molding machine using such apparatus.

Means for Solving the Problems (1) An aspect of the invention relates to a molded product delivery apparatus including:

a first transfer member that transfers a molded product for use in blow molding; and a second transfer member that transfers the molded product, wherein the first transfer member includes first paired chucks which are openable and closable and which hold a portion of an outer wall of the neck portion of the molded product, wherein the second transfer member includes second paired chucks which are openable and closable and which hold another portion of the outer wall of the neck portion of the molded product, and wherein, from a state where the molded product is held by both of the first paired chucks and the second paired chucks simultaneously, by opening one of the first paired chucks and the second paired chucks without interfering with the other, the molded product is delivered between the first paired chucks and the second paired chucks.

According to a first aspect of the invention, the outer wall of the neck portion of the molded product is held by the first and second transfer members simultaneously. In this case, even when the holding height positions of the first and second transfer members are overlapped with or adjacent to each other, the first paired chucks of the first transfer member and the second paired chucks of the second transfer member can be opened and closed without interfering with each other. According to the first aspect of the invention, since the molded product is delivered from one of the first and second transfer members to the other after it is held by the transfer members simultaneously once, mistake of delivery can be reduced, whereby the stability and reliability of the delivery operation can be enhanced. Also, since the first and second transfer members hold the outer wall of the neck portion, it can be used for both erected transfer and inverted transfer. Here, the molded product to be blow molded includes a preformed product (preform), an intermediate molded product (for example, a primarily blow molded product) for use in blow molding, or a final molded product.

(2) In the molded product delivery device of the aspect, the first paired chucks can respectively include a first holding piece contactable with the portion of the outer wall of the neck portion, and the second paired chucks can respectively include a slit allowing a relative movement of the first holding piece, and a second holding piece provided on both sides of the slit and contactable with the other portion of the outer wall of the neck portion.

In this case, since the slit of the second holding piece allows the relative movement of the first holding piece of the first transfer member, the first paired chucks of the first transfer member and the second paired chucks of the second transfer member can be opened and closed without interfering with each other.

Here, the first holding piece respectively provided to the first paired chucks may be formed such that it includes an outer peripheral edge and inner peripheral edge and, in a planer view, a width thereof may narrow toward the outer peripheral edge.

By forming the first holding piece in a tapered shape, since the second transfer member can be centered and guided by the first transfer member holding the molded product as reference, the molded product can be reliably delivered without being damaged.

Here, the second holding piece respectively provided to the second paired chucks nay be formed such that it includes an outer peripheral edge and inner peripheral edge and, in a planar view, the width of the slit narrows toward the outer peripheral edge.

By forming the slit in a tapered groove shape, since the second transfer member can be centered and guided by the first transfer member holding the molded product as reference, the molded product can be reliably delivered without being damaged.

Here, the first transfer member may transfer the molded product in an inverted direction where the neck portion is inverted in the vertical direction, the neck portion of the molded product may have a flange portion projected therefrom, and the first holding piece of the first transfer member may have a groove into which the flange portion can be inserted.

According to the first transfer member used in the inverted transfer, since the first holding piece holds the flange portion from the upper and lower surfaces of the flange portion, the molded product can be prevented from falling off even when it is inverted.

(3) A molded product delivery apparatus according to another aspect of the invention includes:

a first transfer member that transfers a molded product for use in blow molding; and a second transfer member that transfers the molded product at a higher speed than the first transfer member, wherein the first transfer member includes first paired chucks which are openable and closable and which hold a portion of an outer wall of the neck portion of the molded product, wherein the second transfer member includes second paired chucks which are openable and closable and which hold another portion of the outer wall of the neck portion of the molded product, wherein an area of the second paired chucks surrounding the neck portion is set wider than an area of the first paired chucks surrounding the neck portion, and wherein, from a state where the molded product is held by both of the first paired chucks and the second paired chucks simultaneously, by opening one of the first paired chucks and the second paired chucks without interfering with the other, the molded product is delivered between the first paired chucks and the second paired chucks.

The molded product delivery apparatus according to the other aspect of the invention also can provide equivalent effects to the first aspect of the invention and, especially, since the second transfer member includes the second holding pieces on both sides of the slit, the molded product holding performance thereof is likely to become stable than the first transfer member. Also, since the second holding pieces of the second transfer member, which is transferred faster than the first transfer member, surround the neck portion with wider areas, in the high speed transfer, the molded product can be transferred stably.

(4) In the molded product delivery apparatus of the other aspect, the neck portion of the molded product can include a screw portion and a flange portion, and the second paired chucks of the second transfer member can hold the outer wall at an area where the screw portion is formed.

In this case, the second transfer member to be transferred faster than the first transfer member holds the outer wall of the neck portion in the area thereof where the screw portion is formed, by the second holding pieces provided to the second paired chucks. Thus, unlike the conventional apparatus which transfers a molded product by supporting the lower surface of the flange portion, the flange portion can be prevented from being damaged, and thus, the appearance of the molded product can be prevented from being deteriorated.

(5) A further other aspect of the invention defines a blow molding machine including the above-described molded product delivery apparatus. This blow molding machine can also reduce mistake in delivery and can enhance the stability and reliability of the delivery operation.

Here, in a blow molding machine according to the further other aspect of the invention, the second transfer member can transfer the molded product delivered from the first transfer member into the blow molding part. Since the second transfer member includes second holding pieces on both sides of the slit, the molded product holding performance thereof is likely to become stable than that of the first transfer member, and further, it can transfer the molded product to the blow molding part at high speeds.

Also, a blow molding machine according to the further other aspect of the invention further includes a pitch switch part which, while transferring the molded product in the transfer direction toward the blow molding part, can switch the arrangement pitch of the two second transfer members respectively holding the molded products adjacent to each other in the transfer direction.

The two first transfer members connected together through the pitch switch mechanism are easy to deteriorate in position precision due to mechanical errors and the accumulation of such errors. However, since they are centered and guided by the first holding piece and the slit, the position precision can be enhanced.

Also, in a blow molding machine according to the further other aspect of the invention, the second transfer member can horizontally transfer the molded product in an erected state with the neck portion facing upward, and the first transfer member can transfer the molded product while the state of the molded product is changed from the inverted state with the neck portion facing down to the erected state.

Since the first transfer member used in the inverted transfer enables the first holding piece to hold the outer wall of the neck portion and further enables the groove to support the upper and lower surfaces of the flange portion, even when the molded product is inverted, it is prevented from falling off.

(6) A blow molding machine according to a further other aspect of the invention includes:

at least one paired chucks which are openable and closable and which hold a neck portion of a molded product for use in blow molding;

first and second transfer members movable while respectively supporting the at least one paired chucks movably in an opening/closing direction;

first and second rails that respectively guide the first and second transfer members along a transfer direction; and first and second opening/closing drive parts that respectively drive the at least one paired chucks to be opened and closed.

According to this blow molding machine, the opening/closing distance of the respective paired chucks can be reduced to half when compared with a single chuck. Therefore, the reduced opening/closing operation time can reduce the cycle time, thereby being able to enhance the molding capacity. Also, differently from a single chuck, the paired chucks need not incorporate therein a mechanism for opening and closing the leading ends of the chucks and thus are simplified in structure.

(7) In the blow molding machine of the further other aspect, the first and second opening/closing drive parts can respectively include a first parallel link mechanism, the at least one paired chucks respectively can include an engaging part engageable with the first parallel link mechanism, and the first parallel link mechanism can include a movement guide part that guides the movement of the engaging part moving together with the first and second transfer members.

In this case, since the engaging part is always engaged with the guide part of the first parallel link mechanism regardless of the moving positions of the paired chucks, there is eliminated the need to move the first and second opening/closing drive parts together with the transfer member.

(8) In the blow molding machine of the further other aspect, the blow molding machine can further include:

a pitch switch part that switches the arrangement pitch of two paired chucks respectively holding the two molded products adjacent to each other in the transfer direction, while transferring the molded product along the transfer direction.

Thus, the pitch switch can be executed while the molded product is being transferred.

(9) In the blow molding machine of the further other aspect, the pitch switch part can include a second parallel link mechanism including first and second links respectively connected to each of the two paired chucks, and each of the adjacent first links and the adjacent second links, when contacted with each other, can be caused to stop their rotation to thereby maintain a wide pitch state.

This can prevent the first and second links from rotating excessively and thus can prevent the wide pitch from changing.

(10) In the blow molding machine of the further other aspect, the blow molding machine can further include:

a blow molding part including an openable/closable blow cavity split mold; and a positioning part formed to the blow molding part, and the pitch switch part can include a second parallel link mechanism including first and second links respectively connected to each of the two paired chucks, and each of the two paired chucks can respectively include a part to be positioned which is positioned by the positioning part due to the blow cavity split mold being moved and closed.

Thus, since the two paired chucks adjacent to each other in the transfer direction are positioned by using the closing movement of the blow cavity split mold, when closing the mold, the pitch of the two adjacent molded products can be set constant.

Effects of the Invention

According to the invention, it is possible to provide a molded product delivery apparatus which can deliver a molded product without using a flange support structure limited to erected transfer or an inverted support pin limited to inverted transfer, and a blow molding machine using such apparatus.

BRIEF DESCRIPTION OF THE DRAWINGS

FIGS. 15(A)~(C) are views of first and second holding pieces having a centering function.

MODE FOR CARRYING OUT THE INVENTION

Hereinafter, specific description will be given to preferred embodiments of the invention with reference to a comparison example. Here, the embodiments to be described hereinafter do not limit unreasonably the contents of the invention stated in the scope of the patent claims, while all of structures described in the embodiments are not always essential structures as the solving means of the invention.

1. Injection Stretch Blow Molding Machine

Figure 1:
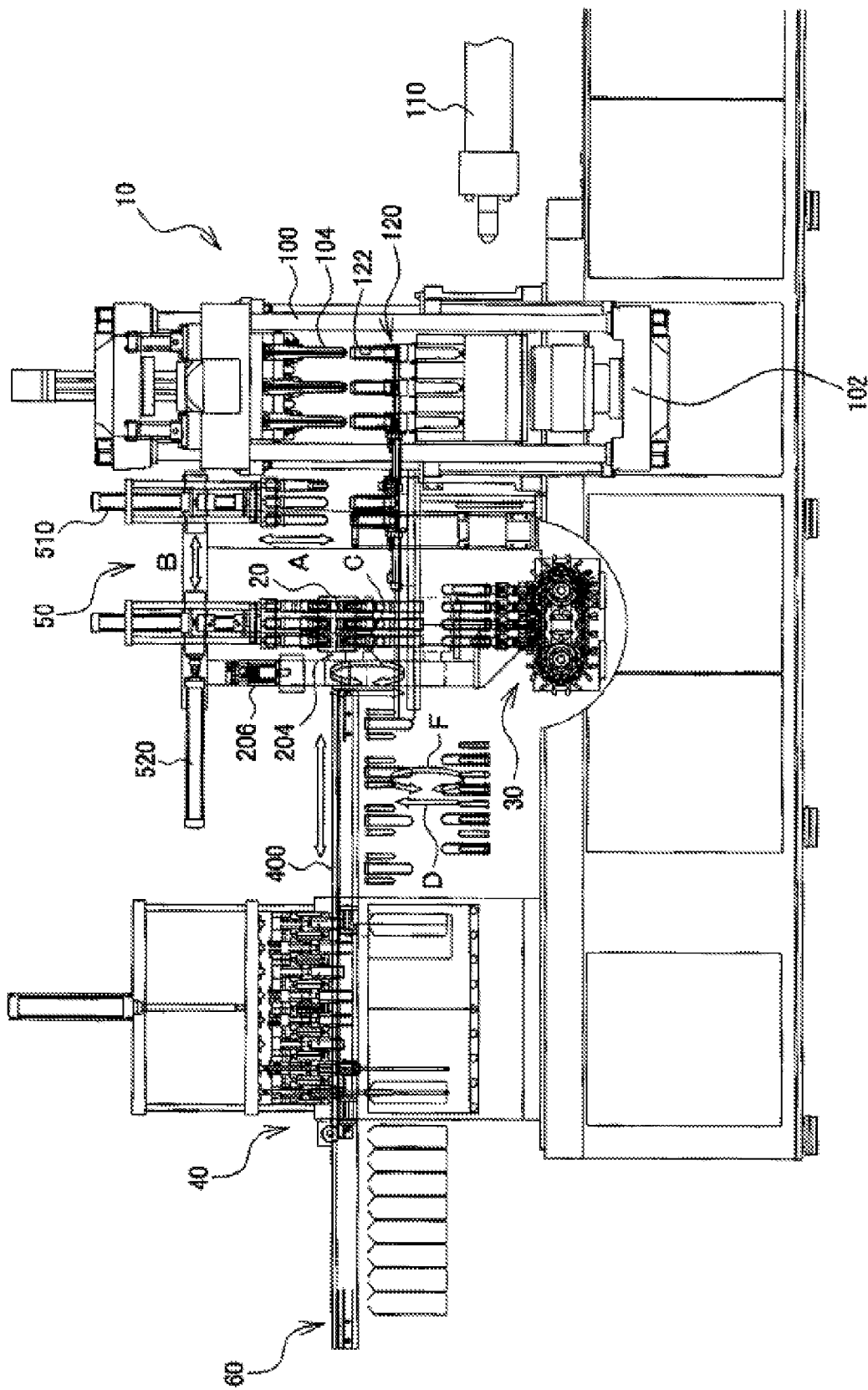
FIG. 1 is a front view of an injection stretch blow molding machine.
Figure 2:
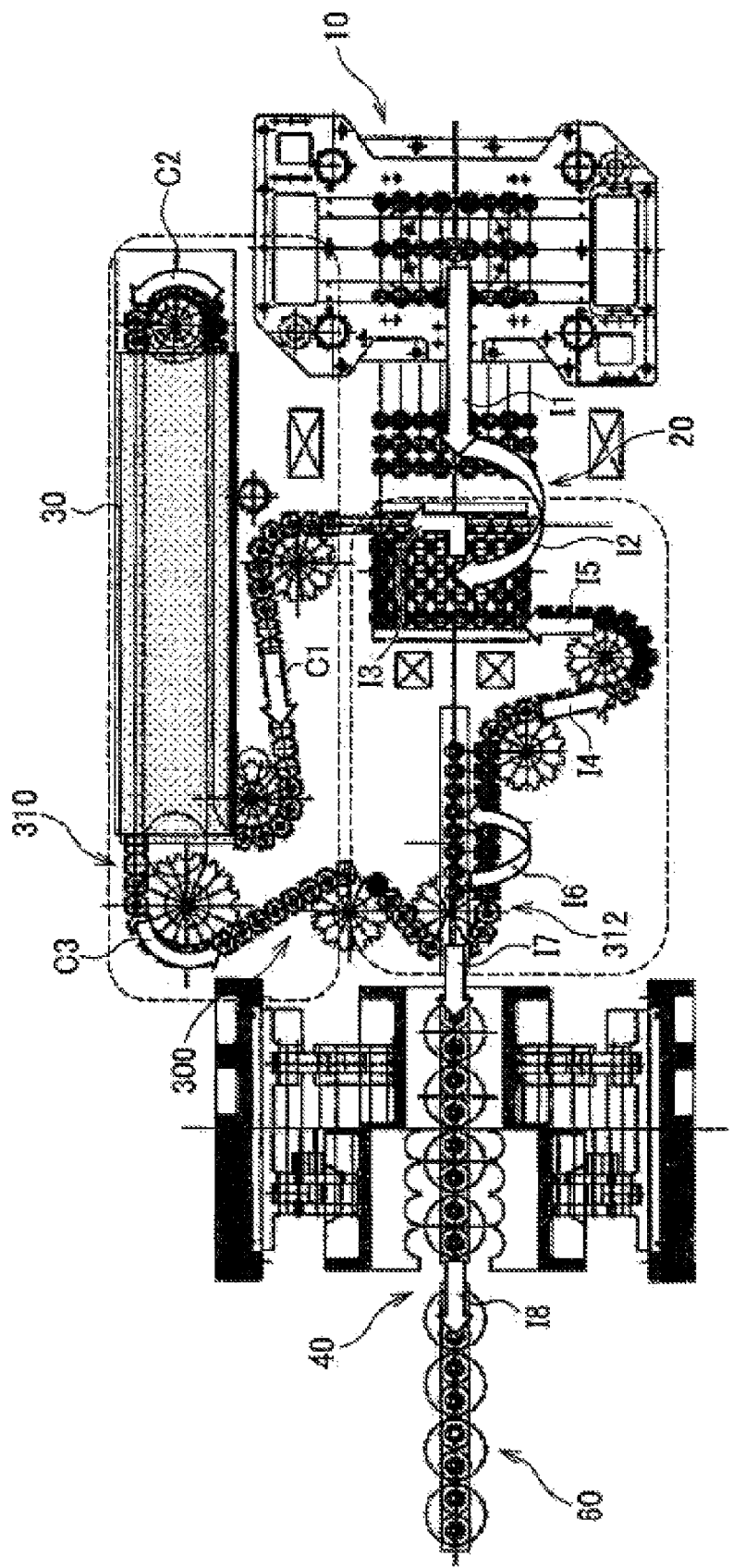
FIG. 2 is a view of intermittent transfer and continuous transfer to be carried out in the injection stretch blow molding machine shown in FIG. 1.

FIG. 1 is a front view of an injection stretch blow molding machine. FIG. 2 is a view of intermittent transfer and continuous transfer used in the injection stretch blow molding machine shown in FIG. 1. Arrows A~F shown in FIG. 1 show the transfer directions of preforms. Of numerals and signs given to the arrows showing the transfer directions of the preforms shown in FIG. 2, I1~I8 respectively mean the intermittent transfer and C1~C3 means the continuous transfer.

In FIGS. 1 and 2, a machine base 1 of the injection stretch blow molding machine includes an injection molding part 10, a cooling part 20, a heating part 30 and a blow molding part 40.

In this embodiment, while N (N is an integer of 2 or more) pieces of preforms simultaneously injection molded are blow molded by M (M=N/n) pieces for n (n is an integer of 2 or more) times, molding temperature differences between the respective times are reduced by forcibly cooling the preforms to thereby uniform the quality of the molded products between containers.

The injection molding part 10 includes a mold clamping mechanism 102 for clamping molds along four tie bars 100 shown in FIG. 1. The mold clamping mechanism 102 clamps an injection core mold 104 shown in FIG. 1 to an injection cavity mold 106. When an injection device 110 nozzle touches a hot runner mold to inject resin, a preform is injection molded.

As shown in FIG. 2, the number N of preforms to be injection molded simultaneously by the injection molding part 10 is, for example, 24 (3 rows×8 pieces) in maximum.

The injection molding part 10 includes a take-out device 120 for taking out N pieces of injection molded preforms in the I1 direction shown in FIG. 2. In the take-out device 120, as shown in FIG. 1, N pieces (for example, 3 rows×8 pieces) of holding members, for example, pots 122 can be moved horizontally between a receiving position existing below the injection core mold 10 and a delivery position existing outward of a space surrounded by the tie bars 100. While the pot 122 is moving horizontally, the row pitch of the pot 122 is switched from a wide pitch (injection molding pitch) at the receiving position to a narrow pitch in the delivery operation. Here, among the three pots 122 shown at the delivery position, two of them are pots for a preform having a large bore and length (the same pot as the pot at the receiving position), and the other is a pot for a preform having a small bore and length. That is, the size and number of the pots 122 are changed according to the size of the preform. Here, although, in FIG. 1, the pots 122 are drawn by solid lines at the receiving position and delivery position, actually, the pots 122 stop only at one of the positions.

N pieces of injection molded preforms are transferred to the cooling part 20 for forcibly cooling the preforms. For this purpose, as shown in FIG. 1, there is provided a preform transfer device 50. The transfer device 50 moves N pieces of preforms held in the three-row pots 122 situated at the delivery position in arrows A and B directions shown in FIG. 1 to thereby transfer them to the cooling part 20.

Figure 3:
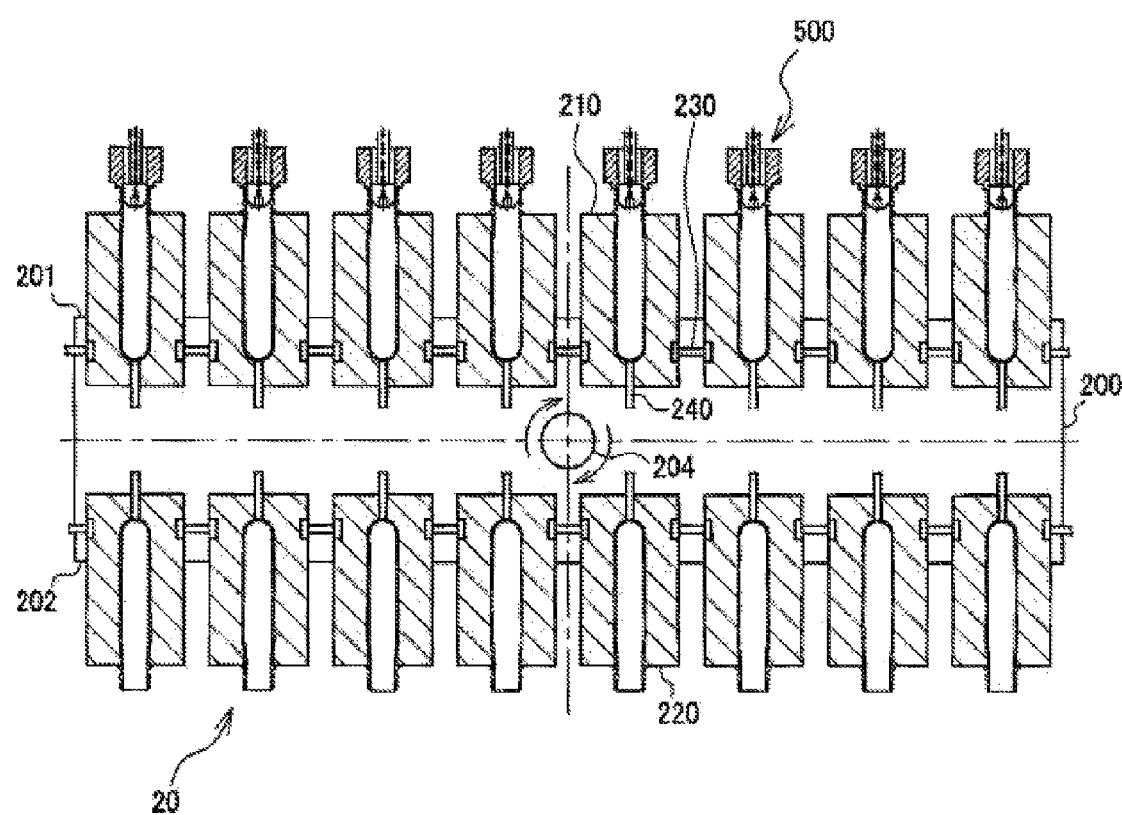
FIG. 3 is a section view of a cooling part.

The cooling part 20 includes, for example, as shown in FIG. 3, an inverting part 200 inverted in the arrow C direction, N pieces of first cooling pots 210 provided on the first surface 201 of the inverting part 200, and N pieces of second cooling pots 220 provided on the second surface 202 of the inverting part 200 opposed to the first surface 201. The first and second cooling pots 210 and 220 are cooled by a refrigerant circulating through a refrigerant passage 230. The first and second cooling pots 210 and 220 respectively have suction holes 240 for sucking the preforms 2. The inverting part 200 can be inverted around a shaft 204. The inverting part 200 can be lifted and lowered by a ball screw driven by a drive source, for example, a servo motor 206 shown in FIG. 2.

Here, in this embodiment, the injection molding part 10 injection molds N pieces of preforms 2 in an erected state with their neck portions facing upward. The inverting part 200 can invert the erected state of the preforms 2 to the inverted state thereof with their neck portions facing downward (see the arrow 12 shown in FIG. 2) and can then deliver them to the transfer member of the heating part 30. That is, the preforms can be inverted during the cooling time and thus the cooling time can be secured long without securing an inverting time or the like separately.

The heating part 30 is used to heat the cooled N pieces of preforms 2 up to a temperature suitable for stretch. In this embodiment, the heating part 30 heats N pieces of preforms 2 in an inverted state with their neck portions 2A facing downward. In this embodiment, further, the heating part heats N pieces of preforms 2 while transferring them consecutively.

Therefore, the heating part 30 is disposed along a consecutive transfer passage 310 constituting a part of a transfer passage 300 forming a closed loop or a circulating loop along which (k×N) pieces of preforms 2 corresponding to k (k is an integer of 1 or more) times of injection molding cycles are transferred. The transfer passage 300, as shown in FIG. 2, includes a plurality of sprockets, a plurality of transfer members engageable with the plurality of sprockets and each holding one preform 2, and a guide rail for guiding the plurality of transfer members along the consecutive transfer directions C1~C3 shown in FIG. 2. In this embodiment, on the transfer passage 300, there coexist the consecutive transfer passage 310 for transferring the preforms along the consecutive transfer directions C1~C3 on the upstream side and an intermittent transfer passage 310 for transferring the preforms along intermittent transfer directions 14 and 15 on the downstream side.

The blow molding part 40 biaxially stretches M preforms by blowing air and by driving a stretch rod along its vertical axis to thereby mold them into containers. A blow cavity mold, a blow core mold and, if necessary, a bottom mold (none of them are shown) are mold-clamped. Their structures are well known, and thus, the description thereof is omitted. There is provided an intermittent transfer mechanism 400 for transferring M preforms 2 from the heating part 30 to the blow molding part 40.

To transfer M preforms 2 from the heating part 30 to the blow molding part 40, the preforms 2 are delivered between an inverting delivery mechanism 70 including a first transfer member 720 configured by first paired chucks 720A and 720B described later and the intermittent transfer mechanism 400 including a second transfer member 411. The inverting delivery mechanism 70 takes out M preforms 2 in an inverted state from transfer jigs intermittently transferred on the downstream of the transfer passage 300 and inverts their states in the F direction shown by the arrow 16 shown in FIG. 2 to an erected state.

Thereafter, as described later, the preforms 2 are delivered from the first paired chucks 720A and 720B of the inverting delivery mechanism 70 to second paired chucks 412 of intermittent transfer mechanism 400, and are then transferred into the blow molding part 40 (see the arrow 17 shown in FIG. 2). Here, the operation shown by the arrow 17 in FIG. 2 to carry the preforms 2 into the blow molding part 40 and the operation shown by the arrow 18 shown in FIG. 2 to carry out the blow molded containers to the take-out part 60 can be carried out simultaneously.

2. Delivery Device

Next, description will be given to a delivery device including the inverting delivery mechanism 70 and intermittent transfer mechanism 400 for delivering the preforms 2 between the two mechanisms.

2. 1. Inverting Delivery Device Existing Downstream of Heating Part

Description will be given to the inverting delivery mechanism 70 which is inverted in the inverting direction shown in FIG. 16 to deliver the preforms 2 to the intermittent transfer mechanism 400 shown in FIG. 2 with reference to FIGS. 4~6.

Figure 4:
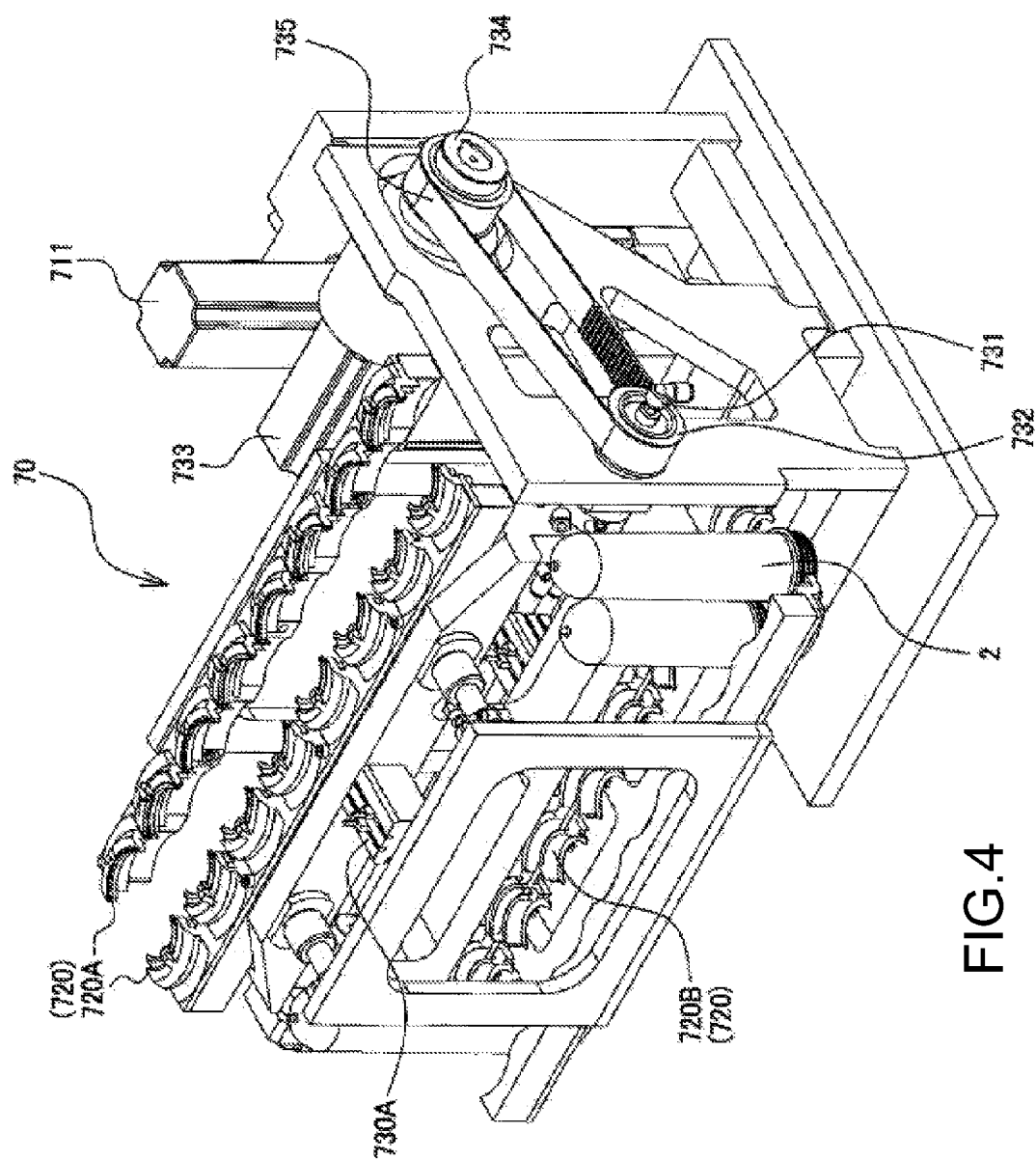
FIG. 4 is a schematically perspective view of an inverted delivery mechanism.
Figure 5:
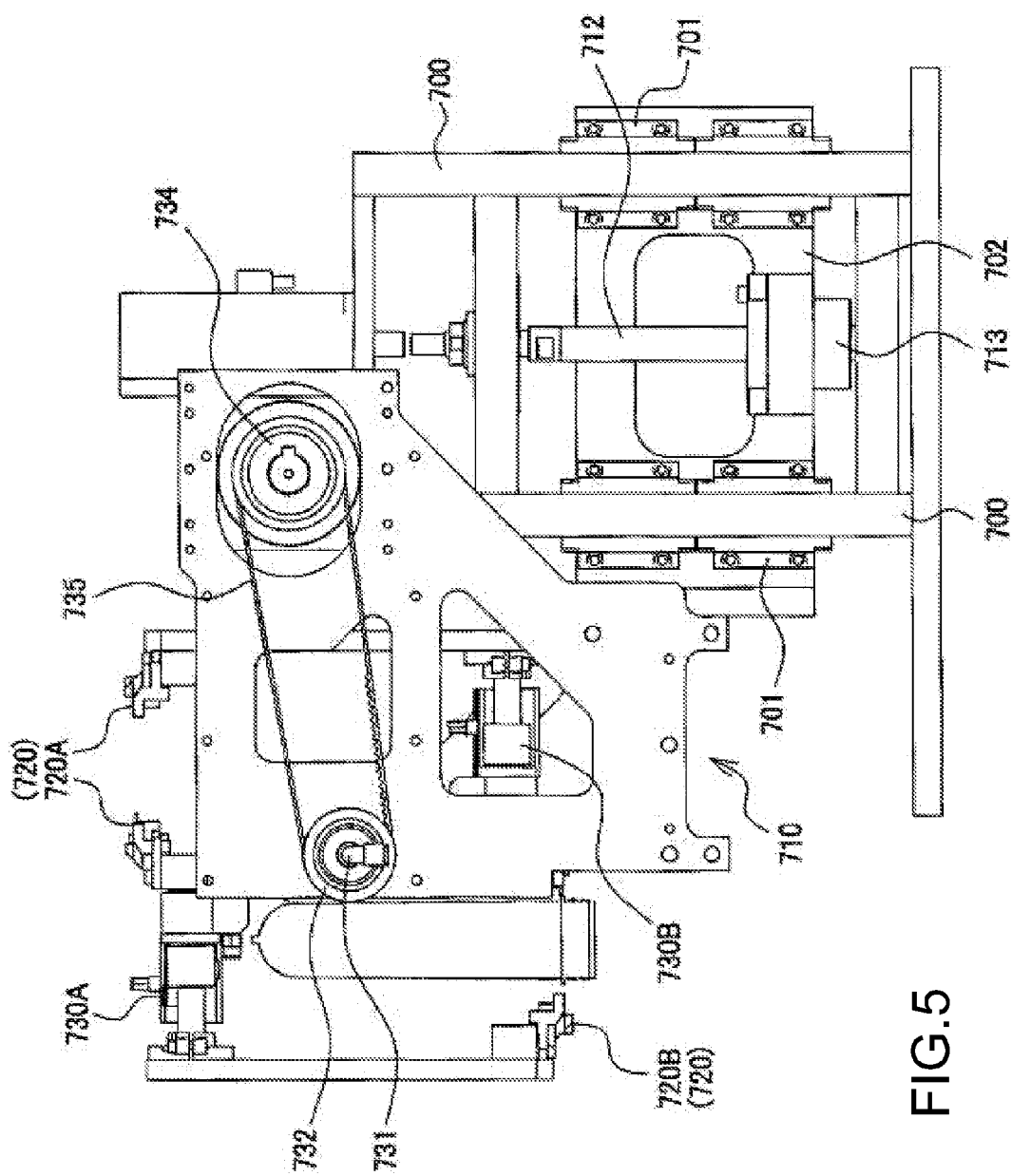
FIG. 5 is a front view of the inverted delivery mechanism.
Figure 6:
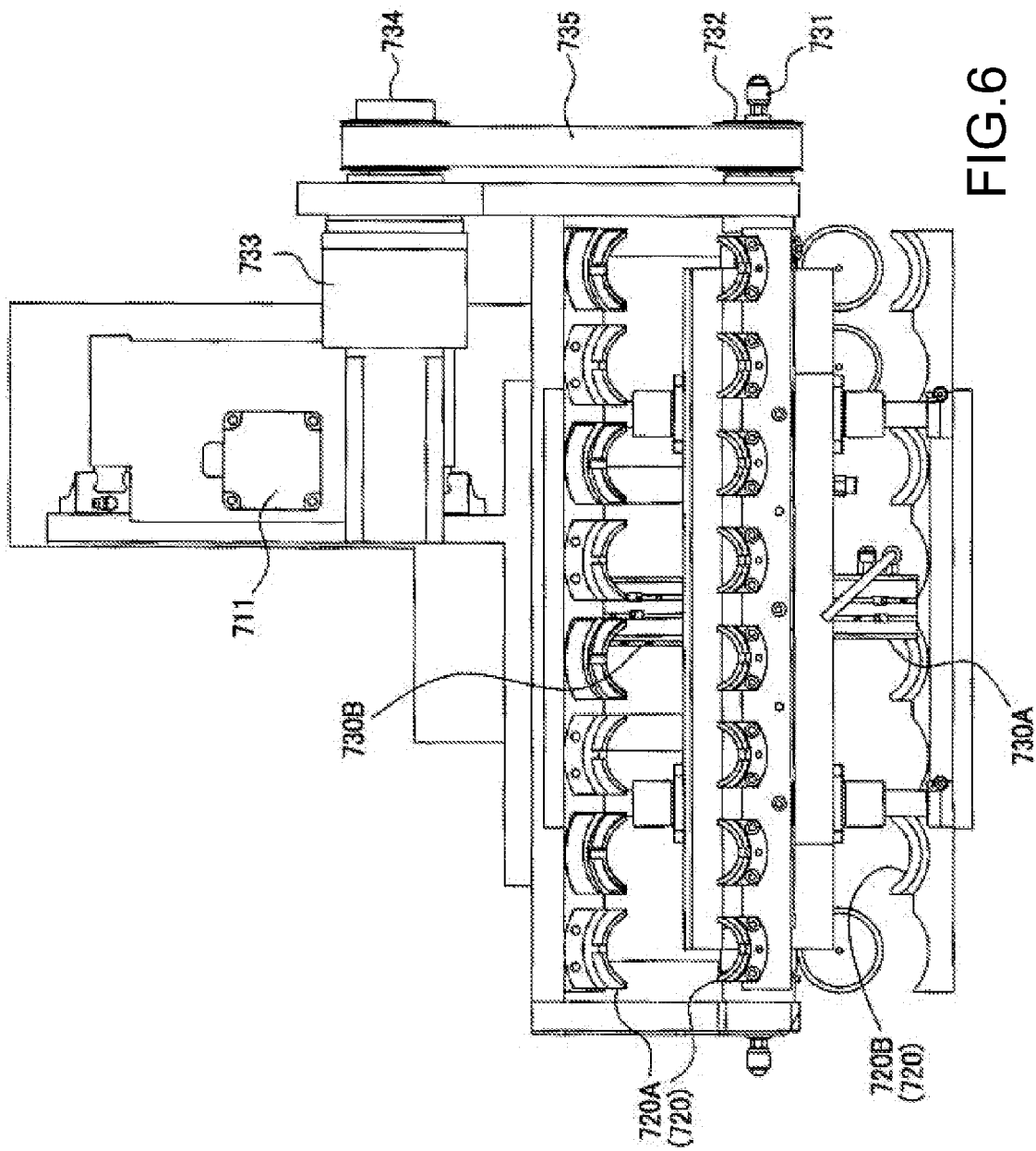
FIG. 6 is a planar view of the inverted delivery mechanism.

As shown in FIGS. 4~6, the inverting delivery mechanism 70 includes an elevation part 710 movable integrally with an elevation plate 702 capable of being lifted and lowered through a linear bearing 701 along a guide shaft 700. The elevation plate 702 includes a nut part 713 threadedly engageable with a ball screw 712 driven by an elevation drive member, for example, a servo motor 711.

The elevation part 710 supports thereon M first paired chucks 720A (first transfer member 720) and M first paired chucks 720B (first transfer member 720) in such a manner that, as shown in FIG. 5, they can be opened and closed simultaneously by opening/closing drive parts, for example, air cylinders 730A and 730B formed in the two upper and lower portions of the elevation part 710. The air cylinder 730A shown in FIG. 5 simultaneously opens and closes the chucks 720A and 720B located on the left side in FIG. 5, while the air cylinder 730B shown in FIG. 5 simultaneously opens and closes the first chucks 720A and 720B (only 720A is shown in FIG. 5) located on the right side in FIG. 5.

The M first paired chucks 720A and the M first paired chucks 720B are rotated about a rotation shaft 731 together with the rotation shaft 731. A grooved pulley 732 is fixed to the rotation shaft 731. A timing belt 735 is stretched over a grooved pulley 734 rotationally driven by a rotation drive part such as a servo motor 733 and the grooved pulley 732 fixed to the rotation shaft 731.

When the elevation part 710 is located at its lowered position, M preforms in an inverted state and heated by the heating part 30 are held in such a manner that M first paired chucks 720B located on the lower side are closed. Then, after the elevation part 710 is elevated, the M first paired chucks 720A and M first paired chucks 720B are rotated about the rotation shaft 731. Accordingly, M first paired chucks 720B are located on the upper side and, as shown by the arrow F in FIG. 2, the preforms 2 are inverted from the inverted state to the erected state.

2.2. Blow Molding Part and Intermittent Transfer Mechanism

Figure 7:
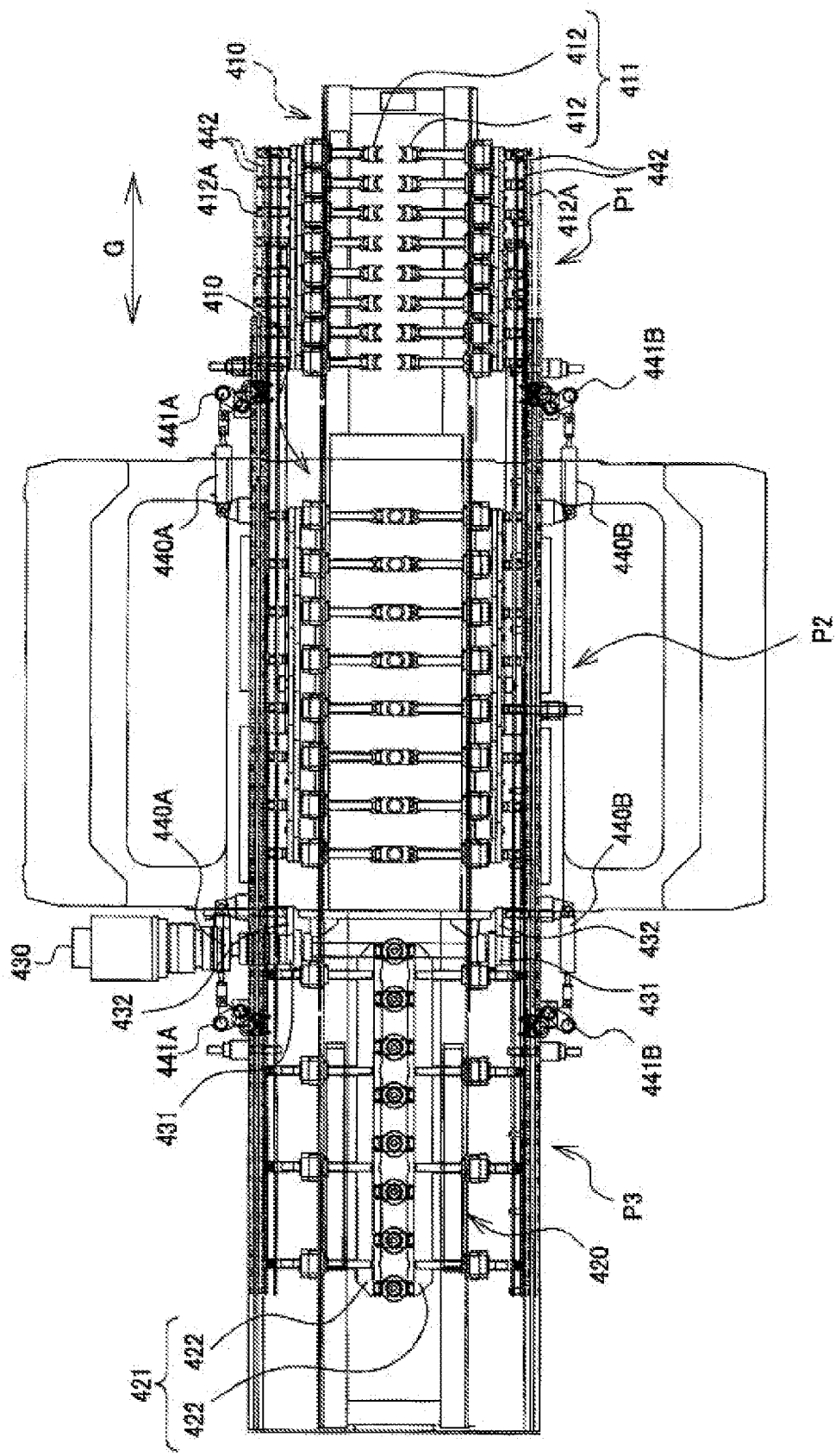
FIG. 7 is a view of a specific example of a blow molding part and an intermittent transfer mechanism.
Figure 8:
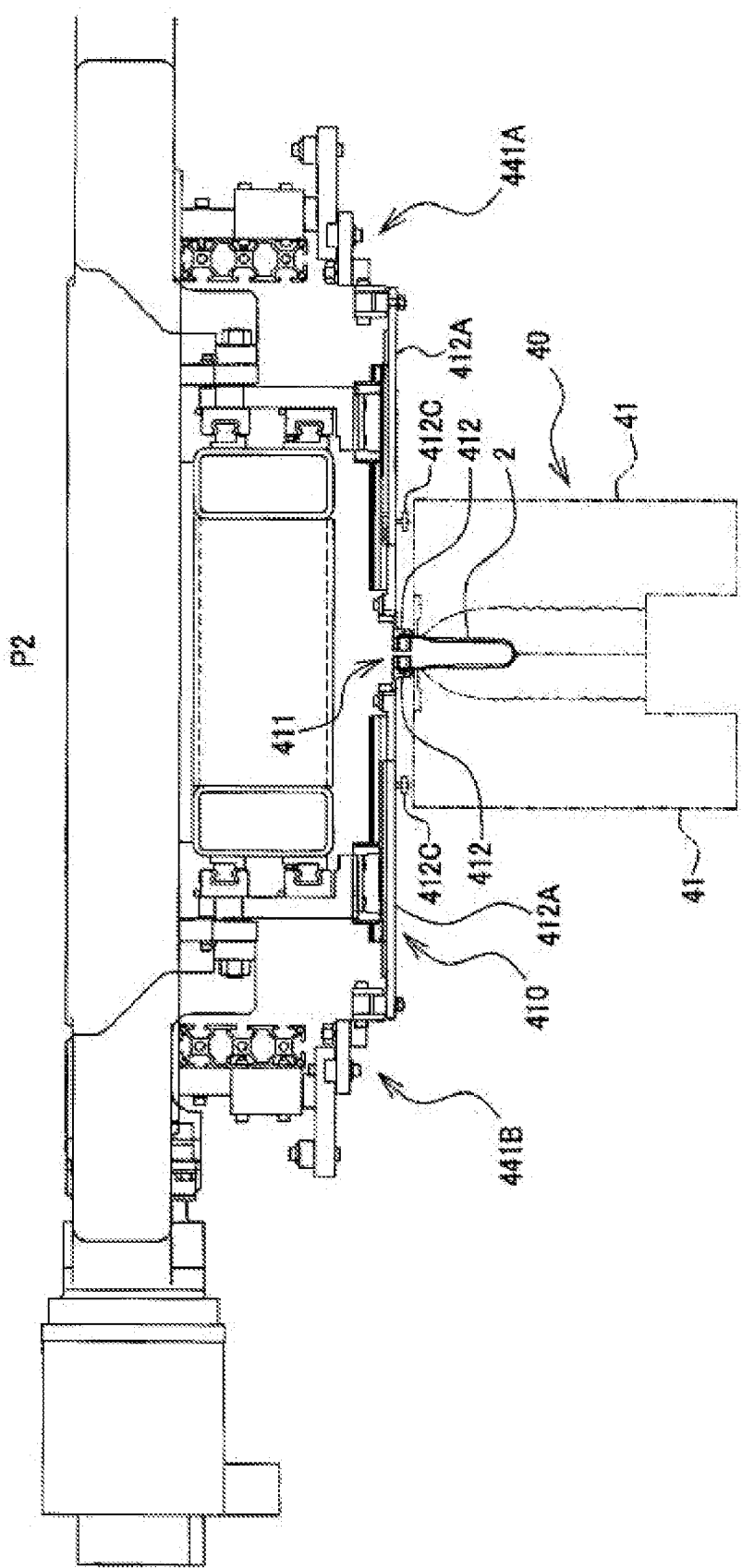
FIG. 8 is a view of the blow molding part.

FIG. 7 shows the specific examples of the blow molding part 40 and intermittent transfer mechanism 400. FIG. 8 is a front view of the blow molding part 40. The intermittent transfer mechanism 400 drives a carry-in part 410 and a carry-out part 420 to reciprocate integrally in a second direction G shown in FIG. 7. This reciprocation drive is realized by reciprocation drive parts such as two pinions 431, 431 fixed to the rotation shaft of the servo motor 430 and two racks 432 (which are only partially shown in FIG. 7) threadedly engaged with the pinions and driven linearly. The carry-in part 410 and carry-out part 420 are driven to reciprocate integrally with the racks 432, 432. Due to such reciprocation drive, the carry-in part 410 reciprocates between a preform receiving position P1 and a blow molding position P2, while the carry-out part 420 reciprocates between the blow molding position P2 and a take-out position P3. Thus, since the preform receiving position P1, blow molding position P2 and take-out position P3 are arranged on a straight line, the transfer operation can be executed with no waste, the transfer mechanism can be simplified and thus the cycle time can be reduced. Here, in FIG. 7, the carry-in part 410 is drawn by solid lines at two positions, that is, at the preform receiving position P1 and blow molding position P2. However, the carry-in part 410 is caused to stop at only one of the two positions.

The carry-in part 410 includes M transfer members (second transfer members) 411 for transferring M preforms. Each of the M transfer members (second transfer members) 411 includes a pair of chucks (which are also called paired chucks or second paired chucks) 412. The carry-out part 420 includes a transfer member 421 (third transfer member) 421 configured by a pair of chucks 422, 422 (third paired chucks) for transferring M containers. When the drive power of a plurality of opening/closing drive parts, for example, four air cylinders 440A, 440B shown in FIG. 7 is transmitted through a link mechanism (first parallel link mechanism) 441 to the pair of chucks 422, 422, the chucks 422 are opened and closed integrally. Here, the air cylinder 440A and a link mechanism 441A driven by the same are called a first opening/closing drive part, while the air cylinder 440B and a link mechanism 441B driven by the same are called a second opening/closing drive part.

As shown in FIG. 8, M second transfer members 411 of the carry-in part 410 carry the M preforms 2 into the blow molding position P2 of the blow molding part 40 from a direction perpendicular to the sheet surface of FIG. 8. At that time, a blow cavity split mold 41 is opened. After then, the blow cavity split mold 41, a blow core mold and, if necessary, a bottom mold (both of which are not shown) are clamped. Thus, the M preforms 2 are delivered to the blow molding part 40. Next, the second paired chucks 412 of M transfer members 411 are opened, whereby the preforms are moved from the blow molding position shown in FIG. 7 to the preform receiving position P2. Simultaneously, the carry-out part 420 is transferred from the take-out position P3 to the blow molding position P2, and the pair of chucks 422 is caused to wait while they are opened.

After then, when M containers are molded of the M preforms 2 in the blow molding part 40, the pair of chucks 422 of the carry-out part 420 is closed to hold the neck portions of M containers. Simultaneously, at the preform receiving position P1, the M second chucks 412 of the carry-in part 410 are closed to hold the next M preforms 2. After then, the carry-out part 420 carries out M containers from the blow molding position P2 to the take-out position P3, while the carry-in part 410 moves the M preforms 2 from the preform receiving position P1 to the blow molding position P2. By repeating this procedure, the blow molding operations in the blow molding part 40 are executed consecutively.

Figure 9:
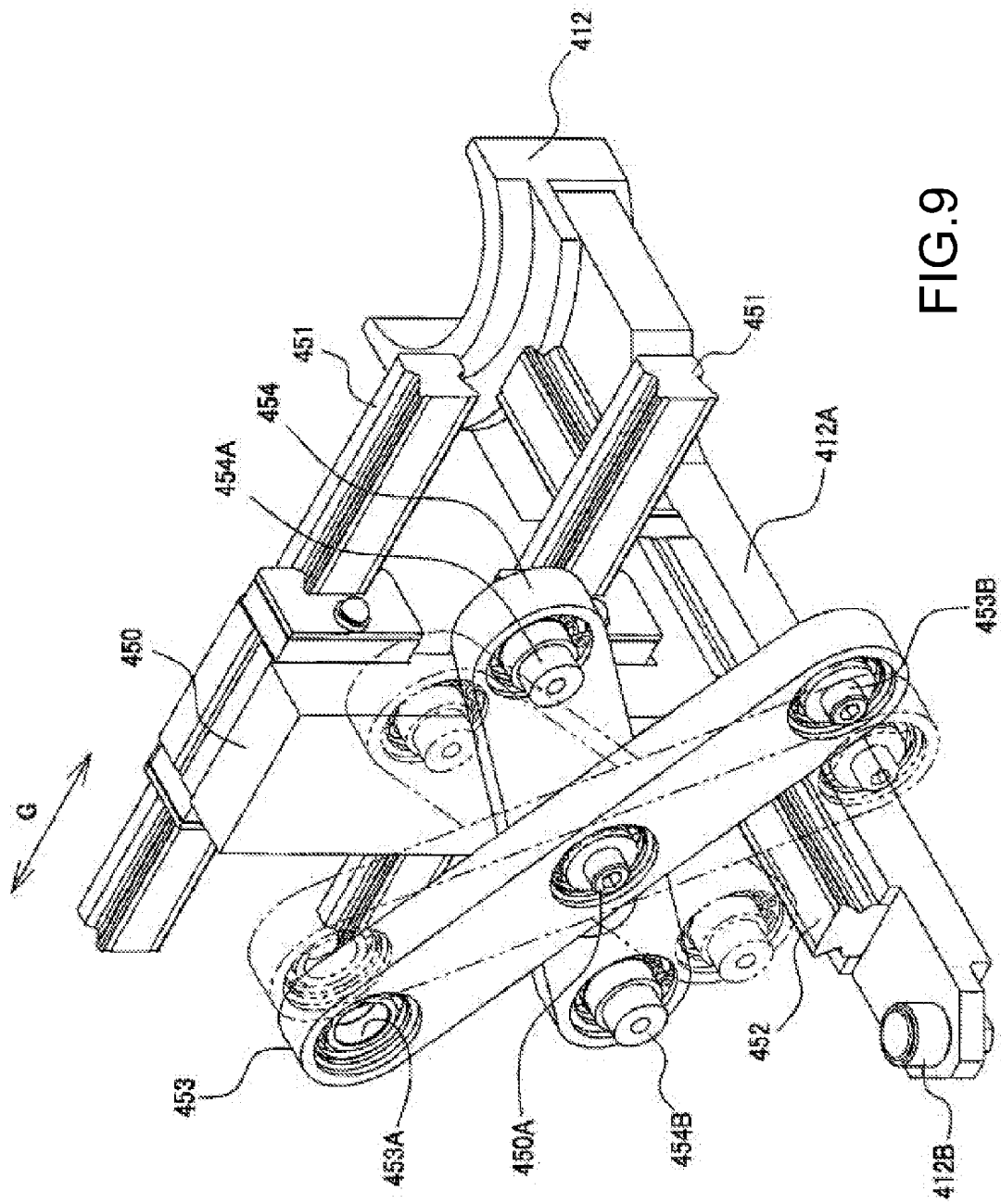
FIG. 9 is a perspective view that explains a second parallel link mechanism of a pitch switch part.
Figure 10:
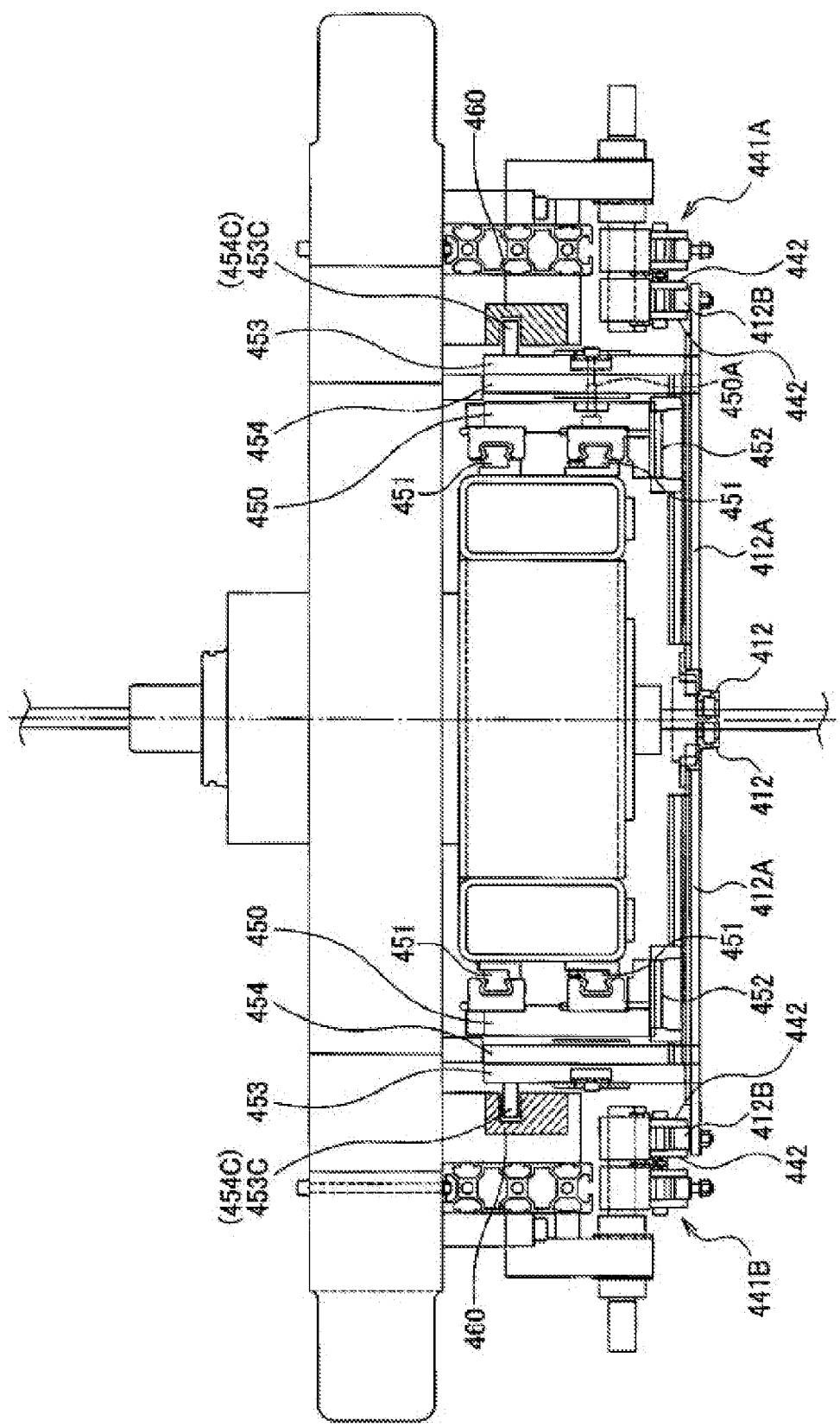
FIG. 10 is a view that explains a cam groove of the pitch switch part and a first parallel link mechanism of an opening/closing drive part.

Description is given of a structure for supporting the second paired chucks 412 with reference to FIGS. 9 and 10. Firstly, the intermittent transfer mechanism 400 includes, for example, upper and lower stage rails 451, 451 extending along the reciprocating direction G of FIG. 9. M transfer members 450 (in FIG. 9, only one is shown) for supporting each of the M second paired chucks are provided to be slidable along the rail 451. A linear guide 452 is fixed to the lower surface of the transfer member 450.

The transfer member 450 includes a fulcrum shaft 450A, while a parallel mechanism, for example, two links 453 and 454 configuring an X link is rotatably supported on the fulcrum shaft 450A. The one-side ends of the two links 453 and 454 configuring the X link, for example, the lower ends 453B and 454B are rotatably connected to the lower end of the X link of an adjacent transfer member (not shown in FIG. 9). Thus, as shown in FIG. 9, when the angles of the X links 453 and 454 vary, an interval between two adjacent transfer members 450 varies. By using this, the intermittent transfer mechanism 400 can switch the pitch of the preforms 2 from the narrow pitch during heating to the wide pitch during blow molding.

For this pitch switch, cam followers 453C and 454C (see FIG. 10) are mounted on the other ends of the two links 453 and 454 configuring the X link, for example, the upper ends 453A and 454A. As shown in FIG. 10, the cam followers 453C and 454C are engaged with cam grooves 460. As the height of the cam groove 460 is varied at every position in the reciprocating direction G shown in FIG. 9, the X links 453 and 454 are oscillated as shown in FIG. 9 to thereby switch the pitch of the second chuck 412. Here, the links 453, 454, cam followers 453C, 454C and cam grooves 460 configure a pitch switch part.

On the other hand, the second paired chucks 412 are fixed to one end of an arm 412A slidable along the linear guide 452. The arm 412A supports a cam follower (engaging part) 412B on its other end. Thus, the transfer member 450 and the second paired chucks 412 are movable in the reciprocating direction G along the rail 451, while such movement is carried out by the drive power of the above-mentioned servo motor 430. Also, the cam followers 412B, as shown in FIG. 10, are engaged with two rails (movement guiding part) 442 to be parallel moved by first parallel link mechanisms 441A and 441B. Therefore, when the drive power of the air cylinder 440 shown in FIG. 7 is transmitted through the first parallel link mechanisms 441 to the cam followers 412B of the second paired chucks 412, the second paired chucks 412 can be opened and closed. Further, the cam followers 412B of the paired second chucks 412 are movable while being engaged with the two rails (movement guiding part) 442. Thus, in both cases where the second paired chucks 412 are located at the position P1 or P2 shown in FIG. 10, the second paired chucks 412 can be opened and closed.

2.3. Structure of First and Second Paired Chucks

The delivery devices 70 and 400 of this embodiment are used to deliver the preforms 2 serving as molded products between the first and second paired chucks 720A (720B) and 412. Next, description will be given to the structures of the first paired chucks 720A (720B) and the second paired chucks 412 for use in such delivery with reference to FIGS. 11~14. Here, FIG. 11 is a section view that shows a state where molded products are held by first and second transfer members 720 and 411 simultaneously, and FIG. 12 is a section view different from FIG. 11, which shows a state where the preforms 2 are held only by the second transfer member 411.

Figure 11:
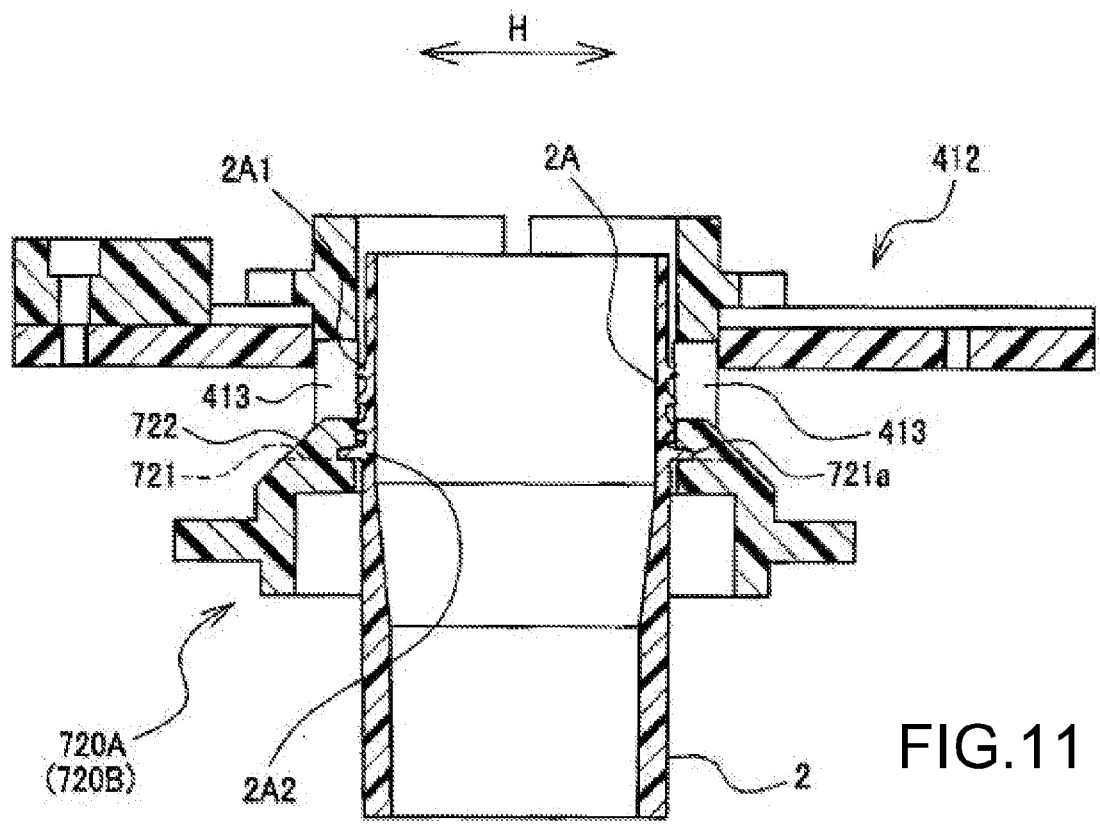
FIG. 11 is a section view that shows a state where a molded product is held by first and second transfer members simultaneously.
Figure 12:
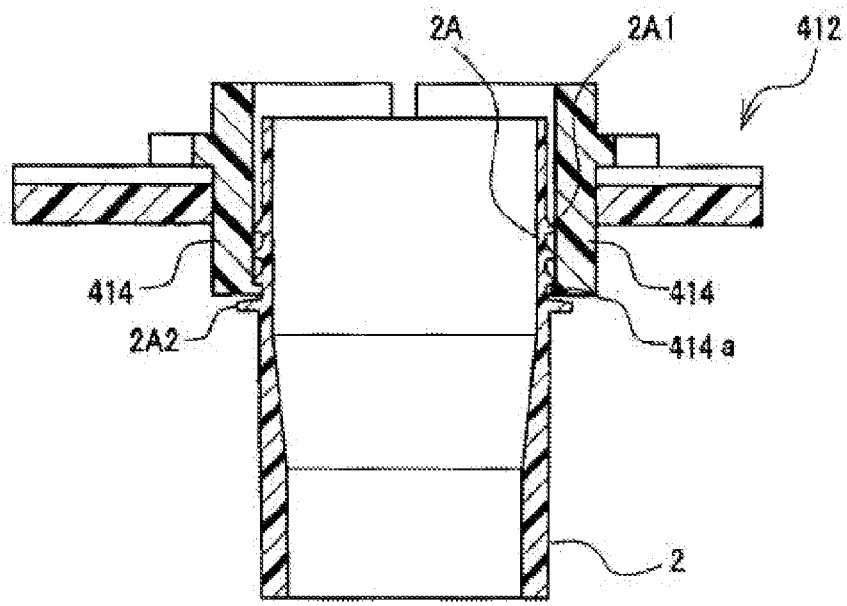
FIG. 12 is a section view, different from FIG. 11, which shows a state where the molded product is held only by the second transfer member.
Figure 13:
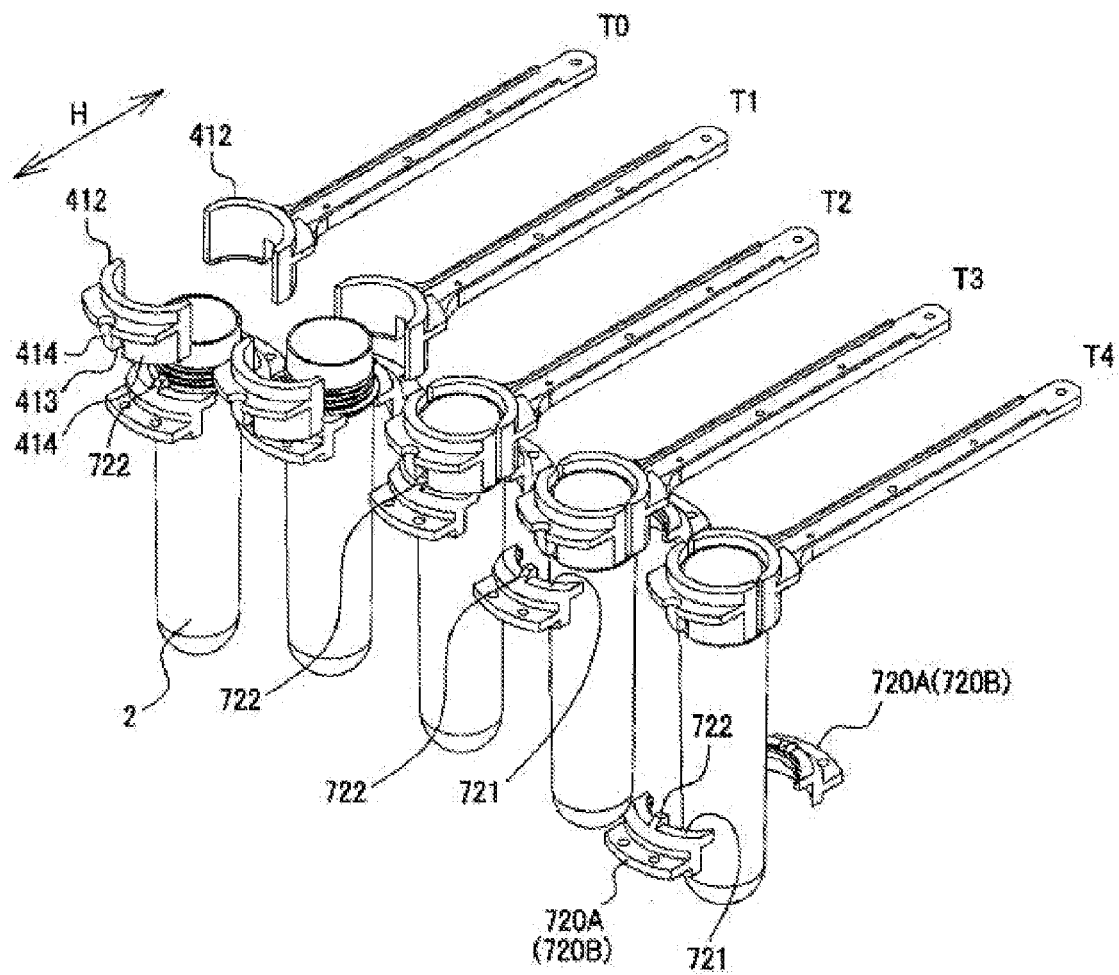
FIG. 13 is a perspective view that shows a delivery procedure from an inverted delivery mechanism to an intermittent transfer mechanism.
Figure 14:
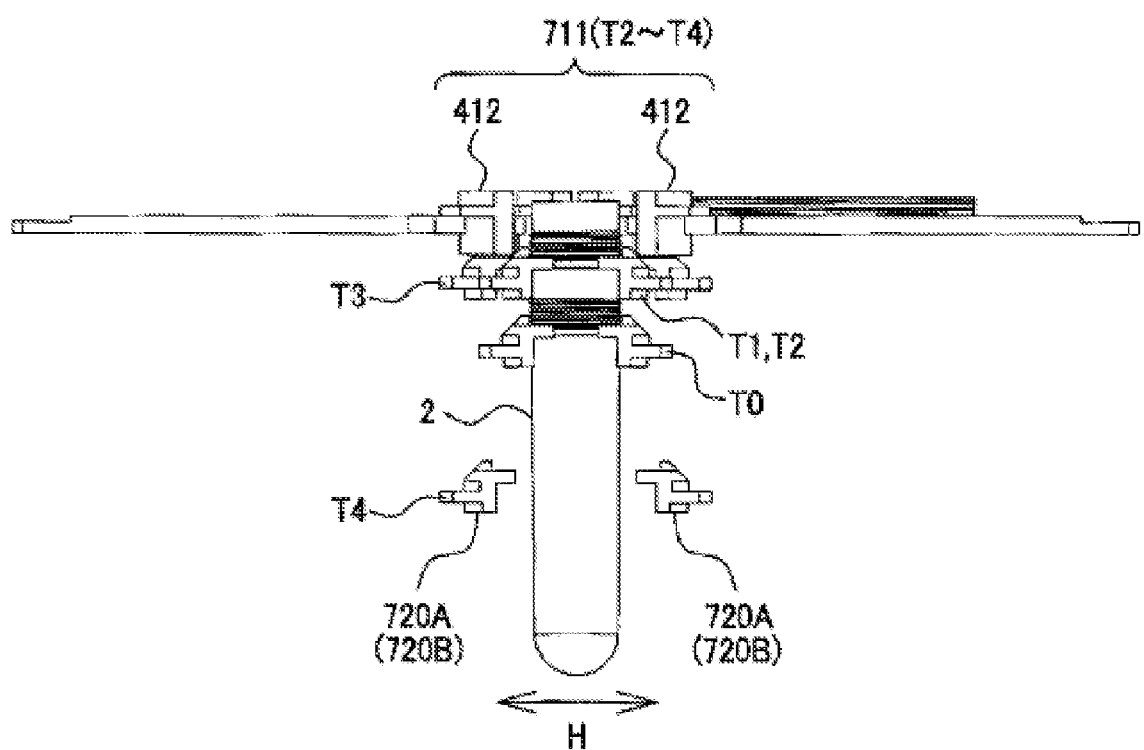
FIG. 14 is a front view that shows a delivery procedure from the inverted delivery mechanism to the intermittent transfer mechanism.

In FIGS. 11~14, the first paired chucks 720A (720B) and the second paired chucks 412 are opened and closed in the same direction, that is, the H direction. However, the opening and closing direction of the first paired chucks 720A (720B) may also be different from that of the second paired chucks 412. As shown in FIGS. 11, 13 and 14, the first paired chucks 720A (720B) include a first holding piece 722 projected locally from the terminal end face of the chuck, for example, the upper surface 721. As shown in FIG. 11, the first holding piece 722 contacts with the neck portion 2A of the preform 2.

The second paired chucks 412 respectively include a slit 413 (see FIG. 11) for moving the first holding piece 722 relatively, and second holding pieces 414 (see FIGS. 12 and 13) respectively provided on both sides of the slit 413.

With this structure, the neck portion 2A of the preform 2 providing a limited holding area can be held by the first paired chucks 720A (720B) and the second paired chucks 412 simultaneously. Also, even when the holding heights thereof are overlapped or are adjacent to each other, there is no possibility that the first paired chucks 720A (720B) and second paired chucks 412 interfere with each other. This is because the slit of the second holding piece 414 allows the relative movement of the first holding piece 722. Since, through the simultaneous holding by the first paired chucks 720A (720B) and the second paired chucks 412, the preform 2 is delivered from one to the other, mistake in delivery can be reduced, whereby the stability and reliability of the delivery operation can be enhanced.

Here, the first paired chucks 720A (720B) are transferring the preform 2 in the inverting direction F shown in FIG. 1 where the direction of the neck portion 2A turns into an opposite direction in the vertical direction. Therefore, the first paired chucks 720A (720B) needs to hold the preform 2 in such a manner that the preform 2 is prevented from falling off regardless of whether the preform 2 is in an erected state or in an inverted state. For this purpose, a flange portion formed to the neck portion 2 of the preform 2 can be used. In FIG. 11, in the neck portion 2A, there is formed a screw portion 2A1 and a support ring 2A2 serving as a flange portion. The first holding piece 722, as shown in FIG. 11, holds the outer wall of the flange portion (outer wall of the neck portion), for example, by a groove 721a contactable with the upper and lower surface sides of the flange portion (support ring 2A2). Thus, even when the preform 2 is turned upside down, the preform 2 can be held stably without falling off from the first paired chucks 720A (720B).

In this embodiment, the second paired chucks 412 for transferring linearly the preform 2 to the blow molding part 40 can transfer the preform 2 faster than the first paired chucks 720A (720B). In this case, since the second paired chucks 412 include the second holding pieces 414 on both sides of the slit 413, the preform 2 holding performance thereof is likely to become more stable than that of the first paired chucks 720A (720B). Also, the neck portion 2A surrounding area of the second holding piece 414 can be made wider than the neck portion 2A surrounding area of the first holding piece 722. Since the second holding pieces 414 of the second paired chucks 412 transferred faster than the first paired chucks 720A (720B) surround the neck portion 2A with a wide area, during the high speed transfer, the preform 2 can be transferred stably.

Also, the second paired chucks 412 can hold the outer peripheral wall of the neck portion 2 and, in this embodiment, it holds the neck outer wall just above the support ring 2A2. The second paired chucks 412, when the screw portion 2A1 exists in the neck portion 2A, as shown in FIG. 12, can hold the top portion of the screw portion 2A1. However, the second paired chucks 412, when the screw portion 2A1 exists in the neck portion 2A, preferably, may hold the other portion than the screw portion 2A1, for example, the lower surface of the screw portion 2A1 located at the lowest stage by a projection 414a shown in FIG. 12. In this case, a load to be applied to the screw portion 2A1 can be reduced. Also, the second paired chucks 412 may also hold the outer peripheral edge portion of the support ring 2A2 and other flange portion than the support ring 2A2, for example, a beat ring (locking ring), as long as it does not interfere with the first paired chucks 720A (720B).

As shown in FIG. 9, when the transfer member 450 for respectively moving the second paired chucks 412 has a parallel link mechanism (second parallel link mechanism) such as the X links 453 and 454, the position precision of the transfer member 450, that is, the second paired chucks 412, at stoppage is worsened. In view of this, preferably, the second paired chucks 412 may be moved and guided to the holding position of the preform 2 by the first paired chucks 720A (720B) waiting while holding the preform 2.

Thus, as shown in FIG. 15(A), a first holding piece 722 respectively provided to the first paired chucks 720A (720B) can be formed in such a manner that it includes an outer peripheral edge 722A and an inner peripheral edge 722B and the width thereof when viewed in a planar view narrows toward the outer peripheral edge 722A. Since the first holding piece 722 is formed in a tapered shape, the moving second paired chucks 412 can be centered and guided with the first paired chucks 720A (720B) holding the preform 2 as the reference.

Or, as shown in FIG. 15(B), a second holding piece 414 respectively provided to the second paired chucks 412 can be formed in such a manner that it includes an outer peripheral edge 414A and an inner peripheral edge 414B, and the width thereof when viewed in a planar view narrows toward the outer peripheral edge 414A. Since the first holding piece 722 is formed in a tapered shape, the moving second paired chucks 412 can be centered and guided with the first paired chucks 720A (720B) holding the preform 2 as the reference.

Or, as shown in FIG. 15(C), the first holding piece 722 can be formed in a tapered shape and the slit 413 can be formed in a tapered groove shape. By employing any one of the structures shown in FIG. 15(A)~15(C), the preform 2 can be reliably delivered without being damaged. Here, with the second paired chucks 412 holding the preform 2 as the reference, in order to center and guide the moving first paired chucks 720A (720B), the slit 413 or first holding piece 722 may be formed to narrow toward the inner peripheral edge 414B or 722B.

On the other hand, the position precision or blow pitch precision of the second paired chucks 412 can also be enhanced by the blow molding part 40. For this purpose, as shown in FIG. 8, on the lower surfaces of the respective arms 412A of the second paired chucks 412, there may be provided, for example, rollers 412C serving as parts to be positioned, which are rotatable in a horizontal plane. Also, in the blow cavity split mold 41 shown in FIG. 10, as shown in FIG. 16, there may be provided M (in FIG. 16, only two are shown) positioning parts 42 arranged at a blow molding pitch P. The positioning part 42 includes a tapered groove 42A, the groove width of which increases toward the leading end thereof. The tapered groove 42A is not limited to a curved shape but may also have a linear shape.

Figure 16:
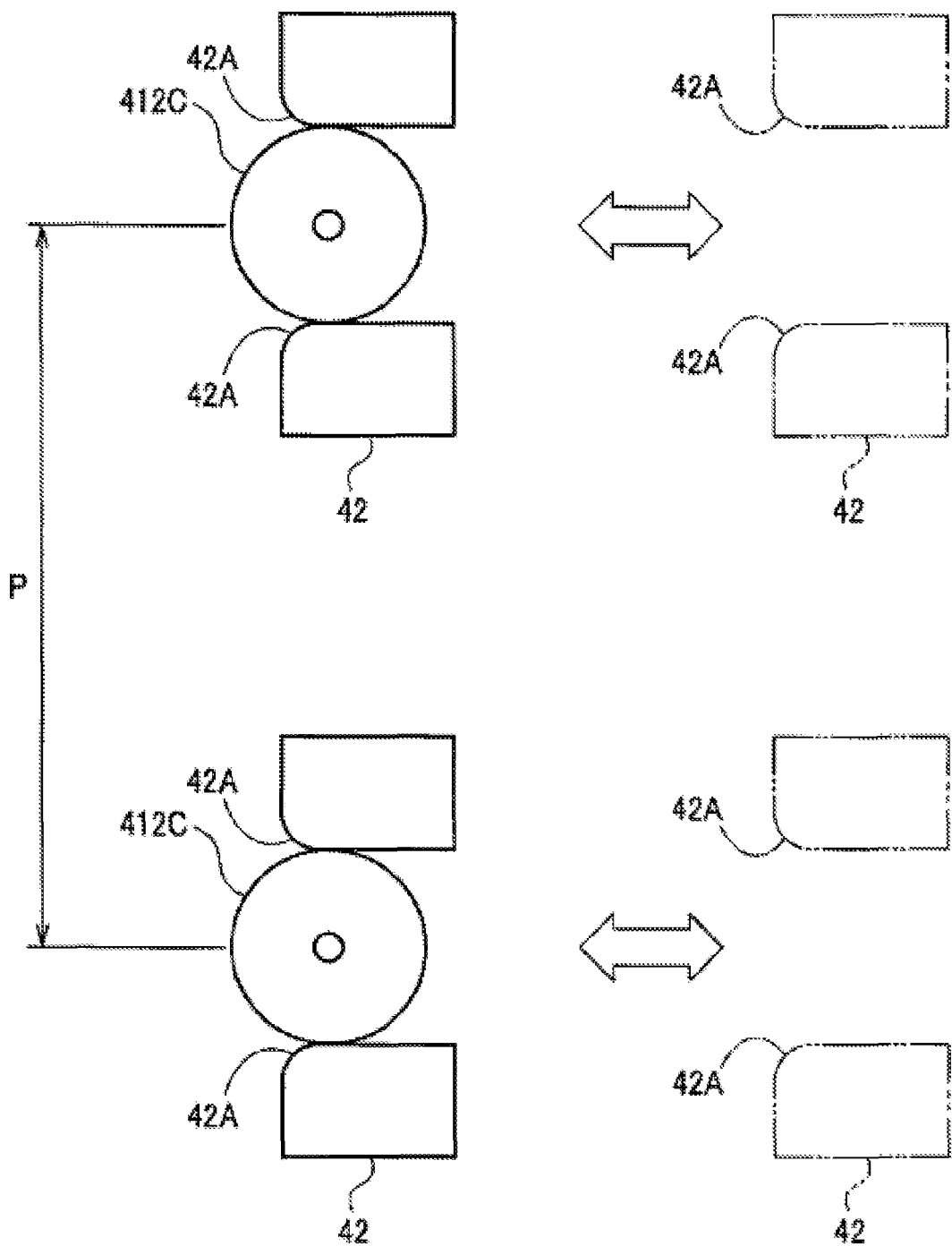
FIG. 16 is an explanatory view of an operation to position a part to be positioned, which is formed to the second paired chucks shown in FIG. 8, by a positioning part of a blow molding part.

While the blow cavity split mold 41 shown in FIG. 10 is opened, the positioning part 42 exists at a position shown by a two-dot chained line in FIG. 16. When the blow cavity split mold 41 is closed, the positioning part 42 moves to a position shown by a solid line in FIG. 16. During this process, the rollers 412C of the second paired chucks 412 carried into the blow molding part 40 are engaged with the tapered grooves 42A of the positioning parts 42, thereby being able to attain the positioning at the blow molding pitch P.

2.4. Modified Example of Pitch Switch Part

Figure 17:
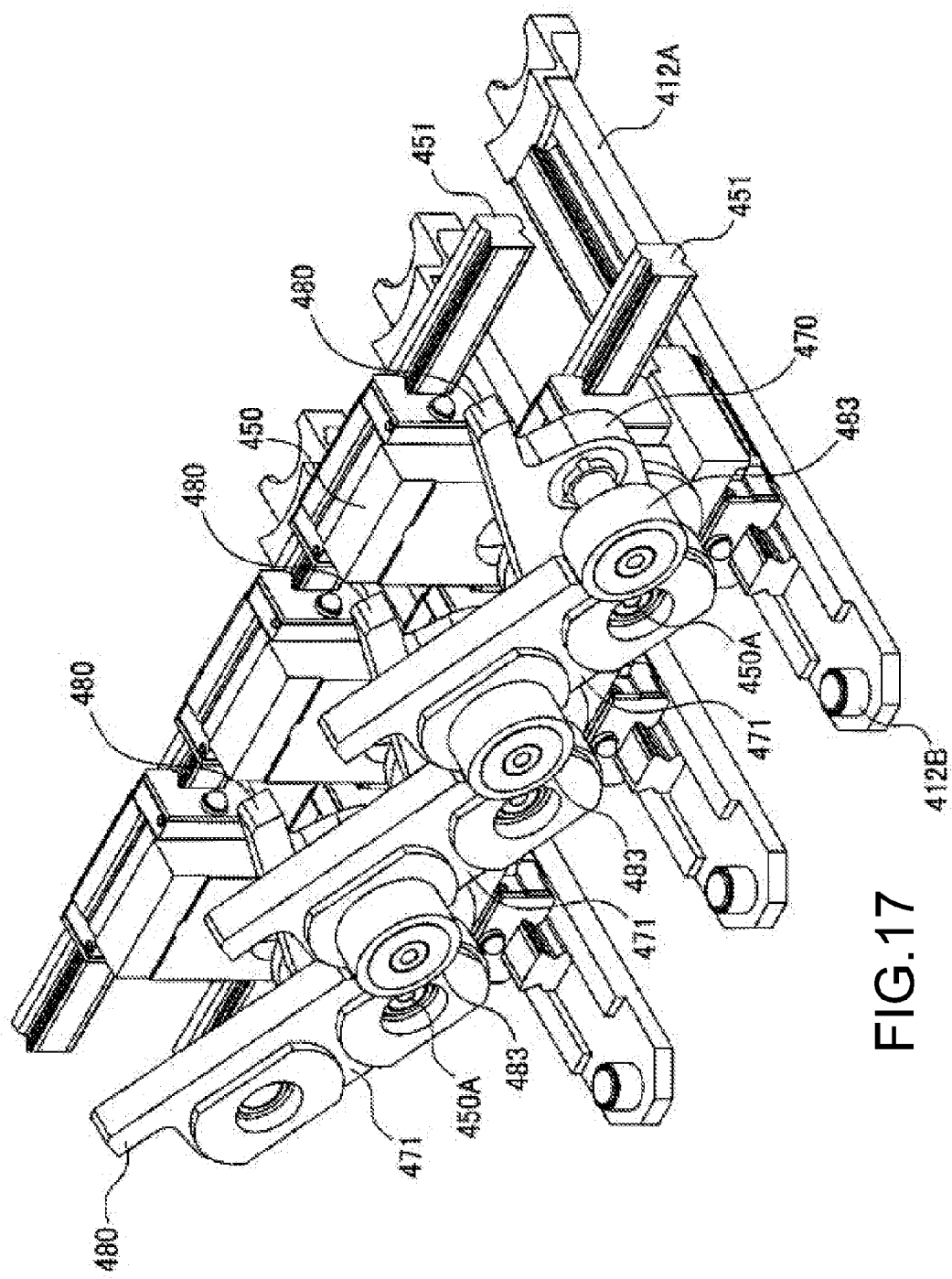
FIG. 17 is a view of a modified example of the second parallel link mechanism for connecting the second paired chucks together.
Figure 18:
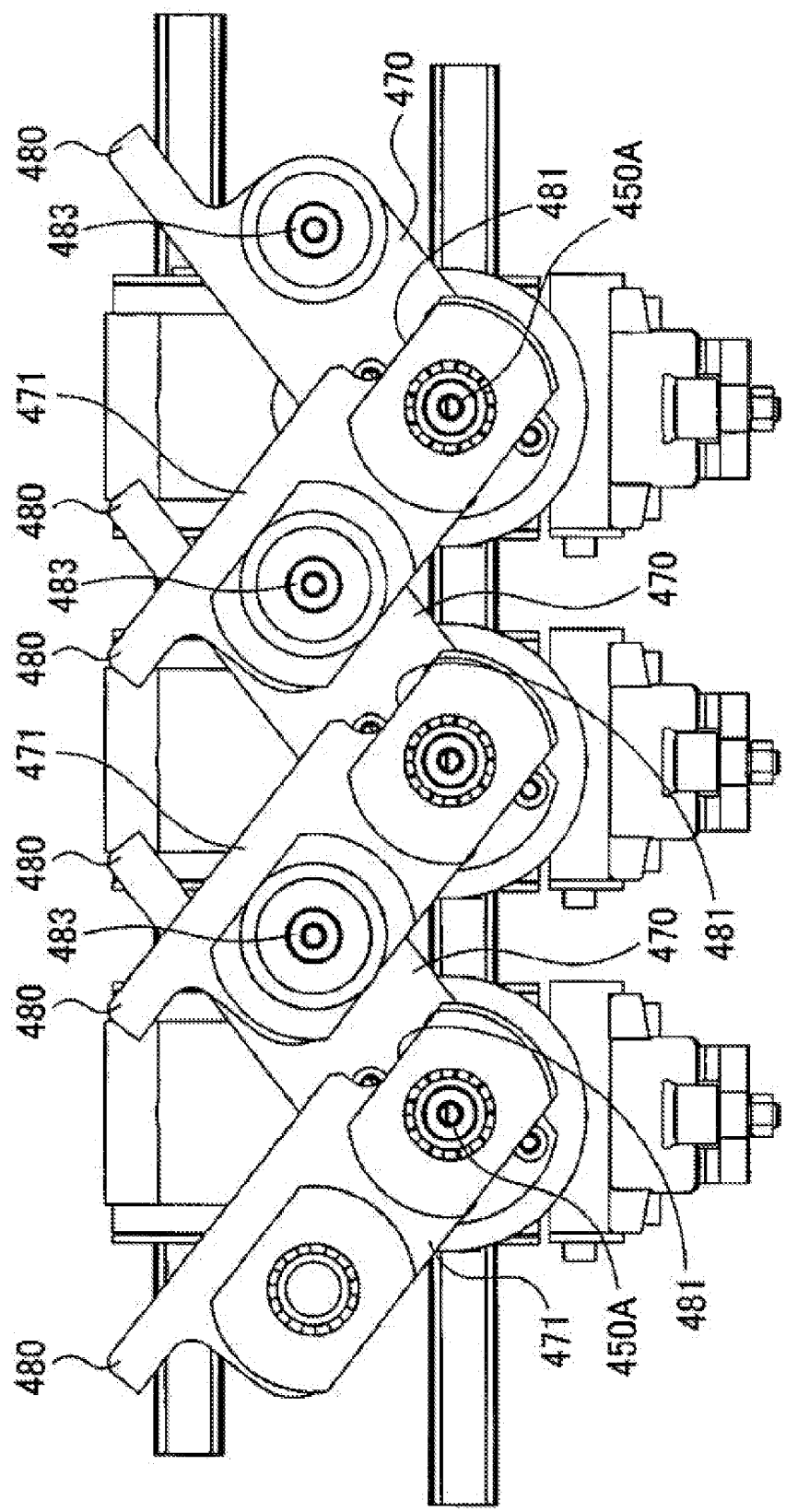
FIG. 18 is a front view of the second parallel link mechanism shown in FIG. 17.

FIGS. 17 and 18 show a modified example of the pitch switch part which can maintain the blow molding pitch (wide pitch) of the second paired chucks 412 without using the part to be positioned 412C and positioning part 42 shown in FIG. 16. However, in FIGS. 17 and 18, the composing elements thereof having the same functions as those shown in FIG. 9 are given the same designations and thus the description thereof is omitted.

In FIGS. 17 and 18, instead of the X links 453 and 454 shown in FIG. 9, first links 470 and second links 471 are rotatably supported on the fulcrum shafts 450A of transfer members 450. In the adjacent two transfer members 450, the first link 470 and the second link 471 are rotatably connected to each other. An aggregate of these first and second links 470 and 471 configures a second parallel link mechanism.

As shown in FIGS. 17 and 18, the first and second links 470 and 471 connected to one transfer member 450 have line symmetry with respect to a perpendicular line passing through the fulcrum shaft 450A. The first and second links 470 and 471 respectively have a projection 480 at their ends that are most distant from the fulcrum shaft 450A. The first and second links 470 and 471 respectively have a notch 481 at their ends disposed opposed to the projection 480 in the longitudinal direction thereof. Also, among the first and second links 470 and 471, the link exposed to the cam groove 460 side shown in FIG. 10 has a cam follower 483 engageable with the cam groove 460. That is, the second parallel link mechanisms 470, 471, cam follower 483 and cam groove 460 configure a pitch switch part.

Figure 19:
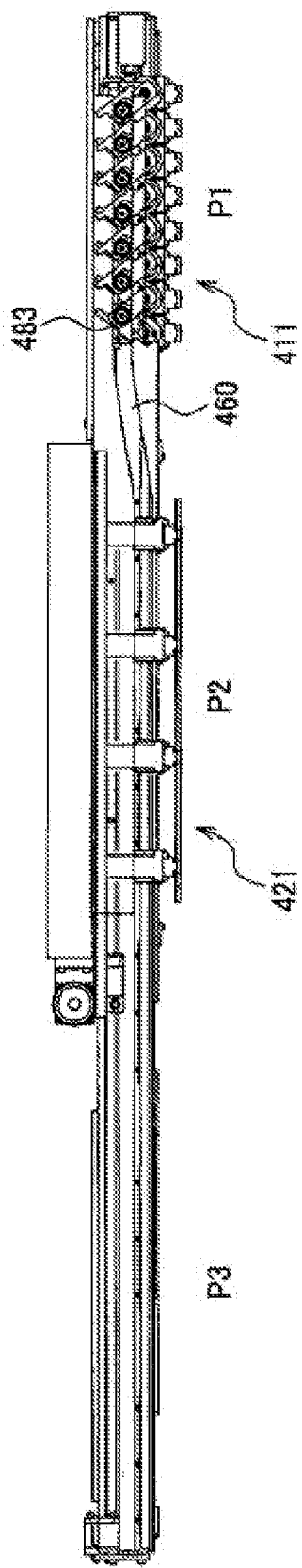
FIG. 19 is a view to show the narrow pitch state of the second paired chucks.

FIG. 19 shows a narrow pitch switching operation executed by the engagement between the cam groove 460 and cam follower 483. As shown in FIG. 19, the height position of the cam groove 460 at the preform receiving position P1 is set high. Thus, as shown in FIGS. 17 and 18, the first and second links 470 and 471 connected to one transfer member 450 cross each other at a relatively small crossing angle. This state provides the narrow pitch state of the second transfer member 411 that is realized at the preform receiving position P1 shown in FIG. 19. At this time, the adjacent transfer members 450 contacts with each other, thereby being able to reliably restrict an interval in the narrow pitch state.

Figure 20:
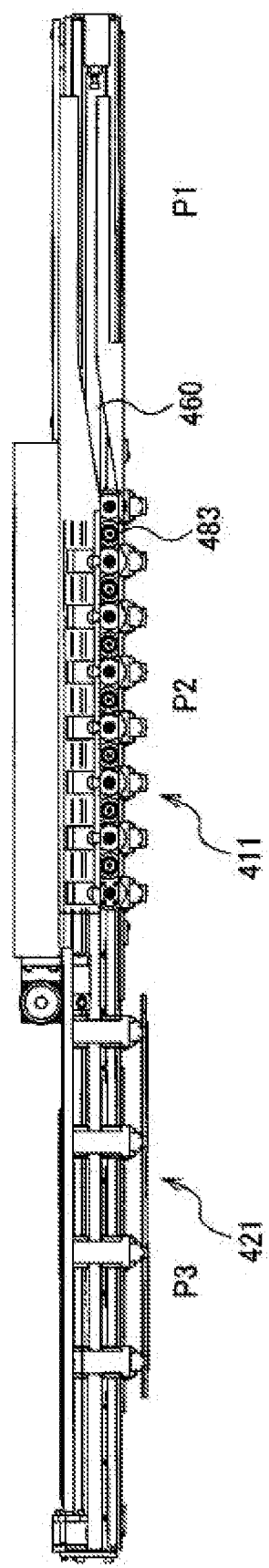
FIG. 20 is a view to show the wide pitch state of the second paired chucks.

Also, FIG. 20 shows a wide pitch switching operation executed by the engagement between the cam groove 460 and cam follower 483. As shown in FIG. 20, the height position of the cam groove 460 at the blow molding position P2 is set low. Thus, the crossing angle of the first and second links 470 and 471 shown in FIGS. 17 and 18 is widened.

Especially, in the adjacent first links 470 and the adjacent second links 471, the projections 480 shown in FIGS. 17 and 18 contacts with the notches 481. That is, the notches 481 become the rotation stoppers of the projections 480, thereby restricting the position relationship between the first links 470 and between the second links 472. In this embodiment, as shown in FIG. 20, at the blow molding position P2, the first links 470 are arranged linearly, while the second links 472 are also arranged linearly. This state provides the wide pitch state of the second transfer member 411 that is realized at the blow molding position P2 shown in FIG. 20.

In FIGS. 19 and 20, there is also shown the state of the transfer member 422 that is moved in linking with the second transfer member 411. As shown in FIGS. 19 and 20, at the blow molding position P2 and take-out position P3, the height position of the cam groove 460 is constant. Thus, the pitch is not switched in the transfer member 421.

2.5 Preform Delivery Operation

Next, description will be given to the delivery operation of the preform 2 from the inverting delivery mechanism 70 shown in FIGS. 4~6 to the intermittent transfer mechanism 400 shown in FIG. 7 with reference to FIGS. 13 and 14.

T0~T4 shown in FIGS. 13 and 14 are timings varying according to time axes, which vary from T0 to T4. FIGS. 13 and 14 show the operations of the first paired chucks 720A and the second paired chucks 412 varying on the time axes from T0 to T4. These operations are executed at the preform delivery position P1 shown in FIG. 7.

At the timing T0, the preform 2 held by the first paired chucks 720A waits below the opened second paired chucks 412. At the next timing T1, the preform 2 held by the first paired chucks 720A is lifted and the neck portion thereof is interposed between the opened second paired chucks 412.

After then, at the timing T2, the opened second paired chucks 412 are closed. Thus, at the timing T2, the neck portion of the preform 2 is held by both the first paired chucks 720A and the second paired chucks 412.

Then, at the timing T3, the first paired chucks 720A are lowered. Thus, the preform 2 is delivered from the first paired chucks 720A to the second paired chucks 412.

Here, after then, the second paired chucks 412 are transferred from the preform receiving position P1 to the blow molding position P2. Further, after then, after the first paired chuck 720A are lowered, they are rotated by the servo motor 733 shown in FIG. 4 and the first chuck 720B holding new M preforms 2 is set at a position shown by the timing T0 in FIGS. 13 and 14. After then, the second paired chucks 412 are returned from the blow molding position P1 to the preform delivery position P1 and are set at a position shown by the timing T0 in FIGS. 13 and 14. From now on, the above-mentioned preform delivery operation is repeated.

Here, although the embodiments have been described specifically heretofore, it can be easily understood by a person skilled in the art that various modifications are possible without substantially departing from the new matters and effects of the invention. Therefore, such modifications also fall under the scope of the invention. For example, in the specification or drawings, a term used at least once together with a different term of broader sense or synonymous sense can be replaced with such different term in any portions of the specification and drawings.

A molded product used in the blow molding is not limited to a pre-molded product (preform) but it may also be an intermediate molded product (for example, a partially blow molded product) or a finally molded product. The invention can be applied to the delivery of these molded products.

The present application is based on Japanese Patent Application No. 2011-231677 filed on Oct. 21, 2011 and Japanese Patent Application No. 2012-229946 filed on Oct. 17, 2012, the contents thereof being incorporated herein for reference.

DESCRIPTION OF REFERENCE NUMERALS AND SIGNS

2: preform
2A: neck portion
2A1: screw portion
2A2: flange portion
10: injection molding part
20: cooling part
30: heating part
40: blow molding part
41: blow cavity split mold
70: inverting delivery mechanism
400: intermittent transfer mechanism
411: second transfer member
412: second paired chucks
412B: engaging part
413: slit
414: second holding piece
414A: outer peripheral edge
414B: inner peripheral edge
440A, 441A: first opening/closing part
440B, 441B: second opening/closing part
441A, 441B: first parallel link mechanism
442: movement guide part
453, 454, 453C, 454C, 460: pitch switch part
460, 470, 471, 483: pitch switch part
454: second parallel link mechanism
470: first link
471: second link
470, 471: second parallel link mechanism
720: first transfer member
720A, 720B: first paired chucks
722: first holding piece
721a: groove
721A: outer peripheral edge
721B: inner peripheral edge
421: third transfer member
422: third paired chucks

The invention claimed is:

1. A blow molding machine comprising an intermittent transfer mechanism, the intermittent transfer mechanism including:
   a plurality of paired chucks which are openable and closable and which hold neck portions of a plurality of molded products for use in blow molding, respectively;
   first and second transfer members movable while respectively supporting the plurality of paired chucks to be openable and closable in a direction perpendicular to an arrangement direction in which the plurality of molded products are arranged;
   a first rail that guides the first transfer member along a transfer direction and a second rail that guides the second transfer member along the transfer direction; and
   first and second opening/closing drive parts that respectively drive the plurality of paired chucks to be opened and closed.

2. The blow molding machine according to claim 1, further comprising: a pitch switch part that switches an arrangement pitch of two paired chucks respectively holding the two molded products adjacent to each other in the transfer direction, while transferring the molded product along the transfer direction.

3. The blow molding machine according to claim 2,
wherein the pitch switch part includes a parallel link mechanism including first and second links respectively connected to each of the two paired chucks, and
wherein each of the adjacent first links and the adjacent second links, when contacted with each other, are caused to stop their rotation to thereby maintain a wide pitch state.

4. The blow molding machine according to claim 2,
wherein the intermittent transfer mechanism is provided with a preform receiving position, a blow molding position and a take-out position, which are arranged on a straight line along the transfer direction,
wherein the intermittent transfer mechanism includes a carry-in part that reciprocates between the preform receiving position and the blow molding position and a carry-out part that reciprocates between the blow molding position and the take-out position,
wherein the carry-in part includes a first group of the plurality of paired chucks including the two paired chucks of which the arrangement pitch is switched by the pitch switch part, and
wherein the carry-out part includes a second group of the plurality of paired chucks of which an arrangement pitch is not switched by the pitch switch part.

5. The blow molding machine according to claim 4,
wherein the intermittent transfer mechanism further includes a reciprocation drive part that reciprocatingly drives the first group of the plurality of paired chucks and the second group of the plurality of paired chucks simultaneously.

* * * * *